US009514413B1

(12) United States Patent
Ozyurt et al.

(10) Patent No.: US 9,514,413 B1
(45) Date of Patent: *Dec. 6, 2016

(54) FRAMEWORK FOR FINDING ONE OR MORE SOLUTIONS TO A PROBLEM

(71) Applicant: The MathWorks, Inc., Natick, MA (US)

(72) Inventors: Derya B. Ozyurt, Brookline, MA (US); Paul Kerr-Delworth, Cambridge (GB); Roy E. Lurie, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,250

(22) Filed: May 1, 2015

Related U.S. Application Data

(63) Continuation of application No. 12/896,493, filed on Oct. 1, 2010, now Pat. No. 9,026,478.

(60) Provisional application No. 61/266,818, filed on Dec. 4, 2009.

(51) Int. Cl.
| | |
|---|---|
| *G06F 15/18* | (2006.01) |
| *G06N 5/02* | (2006.01) |
| *G06N 5/04* | (2006.01) |
| *G06N 99/00* | (2010.01) |
| *G06F 17/16* | (2006.01) |

(52) U.S. Cl.
CPC ............. *G06N 5/04* (2013.01); *G06F 17/16* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 6,014,658 A | * | 1/2000 | Pretz | G06Q 30/02 |
| 7,025,016 B1 | | 4/2006 | Landes | |
| 7,028,016 B2 | * | 4/2006 | Walster | G06F 17/18 |
| | | | | 706/12 |
| 7,260,562 B2 | * | 8/2007 | Czajkowski | G06N 5/003 |
| | | | | 706/13 |
| 7,277,832 B2 | * | 10/2007 | Chiang | G06F 17/12 |
| | | | | 700/49 |
| 7,516,423 B2 | * | 4/2009 | De Smedt | G06F 17/505 |
| | | | | 716/123 |
| 7,672,815 B2 | * | 3/2010 | Asgari | G06N 99/005 |
| | | | | 700/28 |
| 7,730,000 B2 | * | 6/2010 | Hazan | G06N 5/02 |
| | | | | 705/14.43 |

(Continued)

OTHER PUBLICATIONS

Fourer et al., "DrAmpl: a meta solver for optimization problem analysis," Comput Manag Sci (2010) 7:437-463, Published online: Aug. 12, 2009.*

(Continued)

*Primary Examiner* — Kakali Chaki
*Assistant Examiner* — Fuming Wu
(74) *Attorney, Agent, or Firm* — Nelson Mullins Riley & Scarborough LLP

(57) ABSTRACT

In an embodiment, information for use in identifying a plurality of sub-solvers may be acquired. The plurality of sub-solvers may be used in a first attempt to find at least one solution to a problem that may be defined in the acquired information. At least two of the sub-solvers in the plurality of sub-solvers may be of different sub-solver types. The sub-solvers may be identified based on the acquired information. One or more starting points for the identified sub-solvers may be identified and transferred to the identified sub-solvers. One or more outputs, that indicate one or more results associated with the first attempt to find at least one solution to the problem, may be acquired from the identified sub-solvers. One or more sub-solvers may be identified, based on the acquired one or more outputs, for use in a second attempt to find at least one solution to the problem.

20 Claims, 28 Drawing Sheets

(56) References Cited

U.S. PATENT DOCUMENTS

| | | | |
|---|---|---|---|
| 2001/0051936 A1* | 12/2001 | Michalewicz | G06N 5/003 706/46 |
| 2005/0120251 A1 | 6/2005 | Fukumori | |
| 2005/0175127 A1 | 8/2005 | Balz et al. | |
| 2007/0282779 A1* | 12/2007 | Haimov | G06N 5/02 706/57 |
| 2008/0120251 A1* | 5/2008 | Tyagi | G06Q 50/16 705/36 R |
| 2008/0161943 A1* | 7/2008 | Kibkalo | G06N 5/025 700/89 |
| 2008/0178127 A1* | 7/2008 | Dewkett | G06F 17/5045 716/132 |
| 2008/0313113 A1* | 12/2008 | Lim | G06N 3/12 706/13 |
| 2009/0043509 A1 | 2/2009 | Madigan et al. | |
| 2009/0043809 A1* | 2/2009 | Fakhouri | G06Q 10/06 |

OTHER PUBLICATIONS

Dolan et al., "The NEOS Server for Optimization Version 4 and Beyond," Argonne National Laboratory, Preprint ANL/MCS-P947-0202, Feb. 2002.*

Deng, "Simulation-Based Optimization," Ph.D. Dissertation, University of Wisconsin—Madison, 2007.*

European Office Action, EP 10795818.3-1951, dated Jul. 1, 2015, pp. 1-6.

International Search Report and Written Opinion, PCT/US2010/058736, dated Mar. 16, 2011, pp. 1-9.

Dolan et al., "The NEOS Server for Optimization Version 4 and Beyond," Argonne National Laboratory, Preprint ANL/MCS-P947-0202, Feb. 2002.

Fourer, R. et al., "DrAmpl: a meta solver for optimization problem analysis," Computational Management Science, vol. 7:437-463 (2010).

Hagen, Lars W. et al., "Combining Problem Reduction and Adaptive Multistart: A New Technique for Superior Iterative Partitioning," IEEE Transactions on Computer-Aided Design of Integrated Circuits and Systems, vol. 16 (7):709-717 (1997).

Holmstrom et al., "User's Guide for Tomlab 4.0.6," Aug. 1, 2003.

Holmstrom, Kenneth, "TOMLAB—Unique Features for Optimization in MATLAB," retrieved online at http://tomlab.biz, pp. 1-49 (2004).

International Preliminary Report on Patentability for Application No. PCT/US2010/058736, 7 pages., dated Jun. 5, 2012.

Lysiak, Keith et al., "A Generalized MATLAB-based Distributed-computing Optimization Tool," IEEE/ACES International Conference on Wireless Communications and Applied Computational Electromagnetics, pp. 170-173 (2005).

Vailerio, Keith S. et al. "Energy-Efficient Graphical User Interface Design", IEEE Transaction on Mobile Computing, vol. 5, No. 7, Jul. 2006.

* cited by examiner

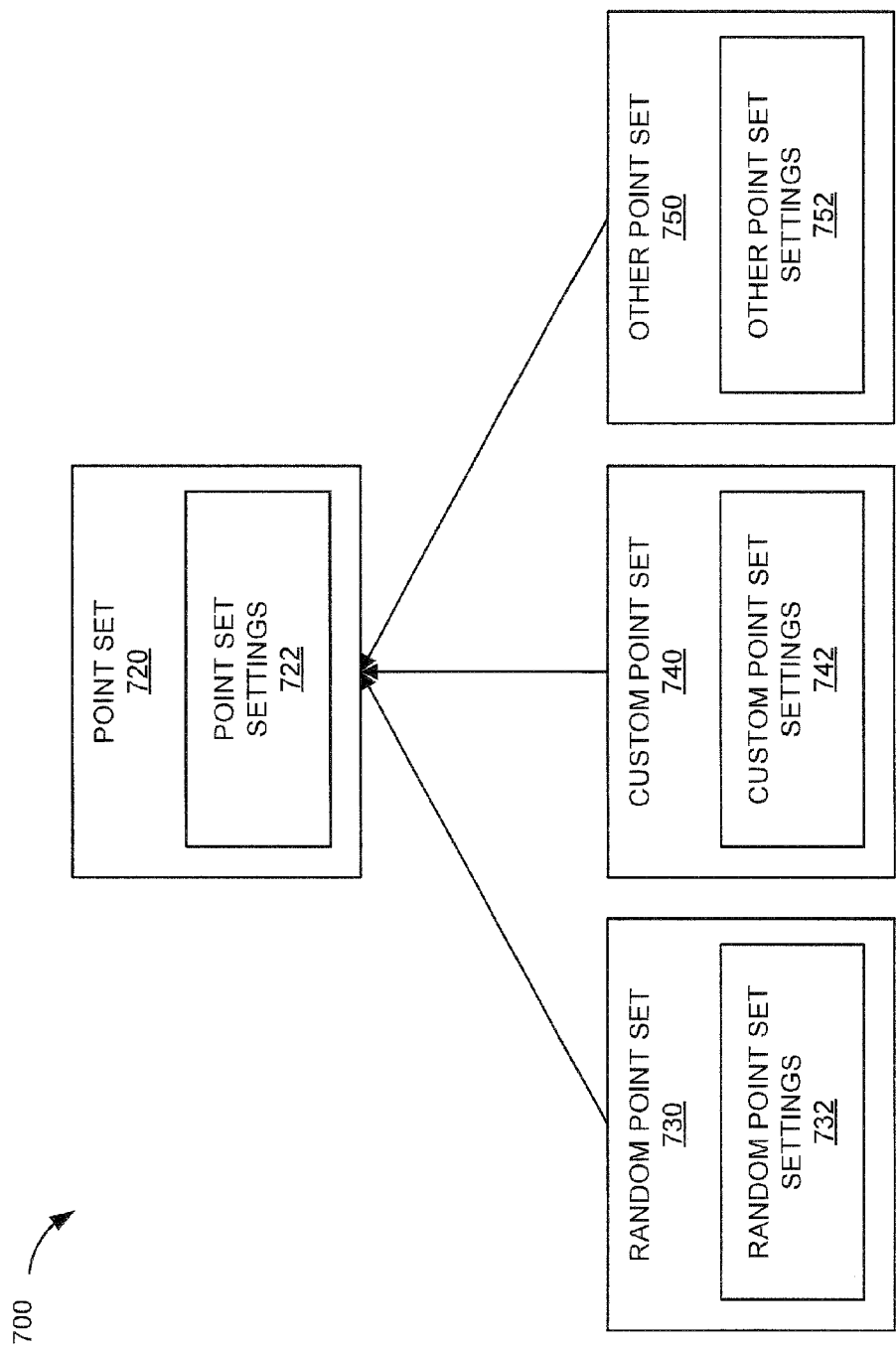

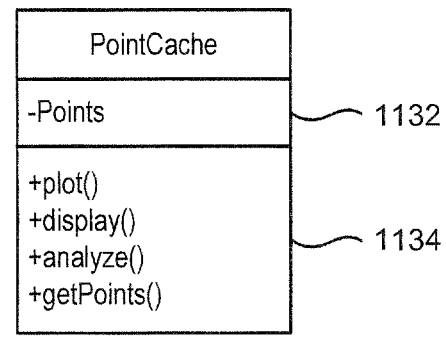
FIG. 11

| Num Pts Analyzed | F-count | Best f(x) | Current Penalty | Threshold Penalty | Local f(x) | Local exitflag | Procedure |
|---|---|---|---|---|---|---|---|
| 0 | 21 | 6.787e-005 | | | 6.787e-005 | 5 | Initial Point |
| 200 | 1448 | -3.05 | -3.941 | -3.456 | -3.05 | 5 | Stage 1 Local |
| 244 | 1560 | -6.551 | -1.723 | -0.2954 | -6.551 | 5 | Stage 2 Local |
| 271 | 1644 | -6.551 | -0.7472 | -0.1155 | -6.551 | 5 | Stage 2 Local |
| 296 | 1721 | -6.551 | -0.2527 | -0.7472 | -6.551 | 5 | Stage 2 Local |
| 300 | 1729 | -6.551 | -0.1325 | -0.1182 | | | Stage 2 Search |
| 319 | 1805 | -6.551 | 0.2938 | 0.3128 | -6.551 | 5 | Stage 2 Local |
| 342 | 1881 | -6.551 | 0.05524 | 0.2938 | -2.577e-005 | 5 | Stage 2 Local |
| 343 | 1922 | -6.551 | 0.1069 | 0.1952 | 4.103e-005 | 1 | Stage 2 Local |
| 367 | 1982 | -6.551 | 0.05068 | 0.1999 | 4.157e-005 | 5 | Stage 2 Local |
| 392 | 2059 | -6.551 | 0.03707 | -2.691e-005 | 7.354e-005 | 5 | Stage 2 Local |
| 400 | 2075 | -6.551 | -2.329 | 0.2 | | | Stage 2 Search |
| 441 | 2178 | -6.551 | 0.0001086 | 0.116 | -3.05 | 5 | Stage 2 Local |
| 473 | 2318 | -6.551 | 5.382e-005 | 0.0001086 | -3.05 | 5 | Stage 2 Local |
| 481 | 2337 | -6.551 | -0.04914 | -0.4392 | 5.382e-005 | 5 | Stage 2 Local |
| 500 | 2375 | -6.551 | -3.619 | -3.619 | | | Stage 2 Search |
| 600 | 2575 | -6.551 | 2.303 | -2.735 | | | Stage 2 Search |
| 700 | 2775 | -6.551 | -0.1894 | 0.1683 | | | Stage 2 Search |
| 742 | 2891 | -6.551 | -0.2044 | -0.1894 | -6.551 | 5 | Stage 2 Local |
| 743 | 2922 | -6.551 | 0.03076 | 0.000288 | -6.551 | 5 | Stage 2 Local |
| 800 | 3036 | -6.551 | -0.1612 | 0.000288 | | | Stage 2 Search |
| 805 | 3080 | -6.551 | -0.2317 | -0.1612 | -6.551 | 5 | Stage 2 Local |
| 809 | 3120 | -6.551 | 0.01176 | 0.1889 | -6.551 | 5 | Stage 2 Local |
| 843 | 3215 | -6.551 | -5.018 | -5.018 | 4.02e-005 | 5 | Stage 2 Local |
| 900 | 3329 | -6.551 | -5.91 | -6.546 | | | Stage 2 Search |
| 1000 | 3529 | -6.551 | | | | | Stage 2 Search |

FIG. 20A

FRAMEWORK FOR FINDING ONE OR MORE SOLUTIONS TO A PROBLEM

RELATED APPLICATIONS

This application is a continuation of U.S. patent application Ser. No. 12/896,493, filed on Oct. 1, 2010; which claims priority to U.S. Provisional Patent Application No. 61/266,818, filed on Dec. 4, 2009.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 7 illustrates a block diagram of an example of a point framework that may be used to identify one or more points for one or more solvers;

FIG. 11 illustrates a class diagram of an example object that may be used to implement a point cache;

FIGS. 20A-B illustrate various presentations of one or more solutions that may be found by a meta-solver/sub-solver arrangement.

DETAILED DESCRIPTION

Figure 1:
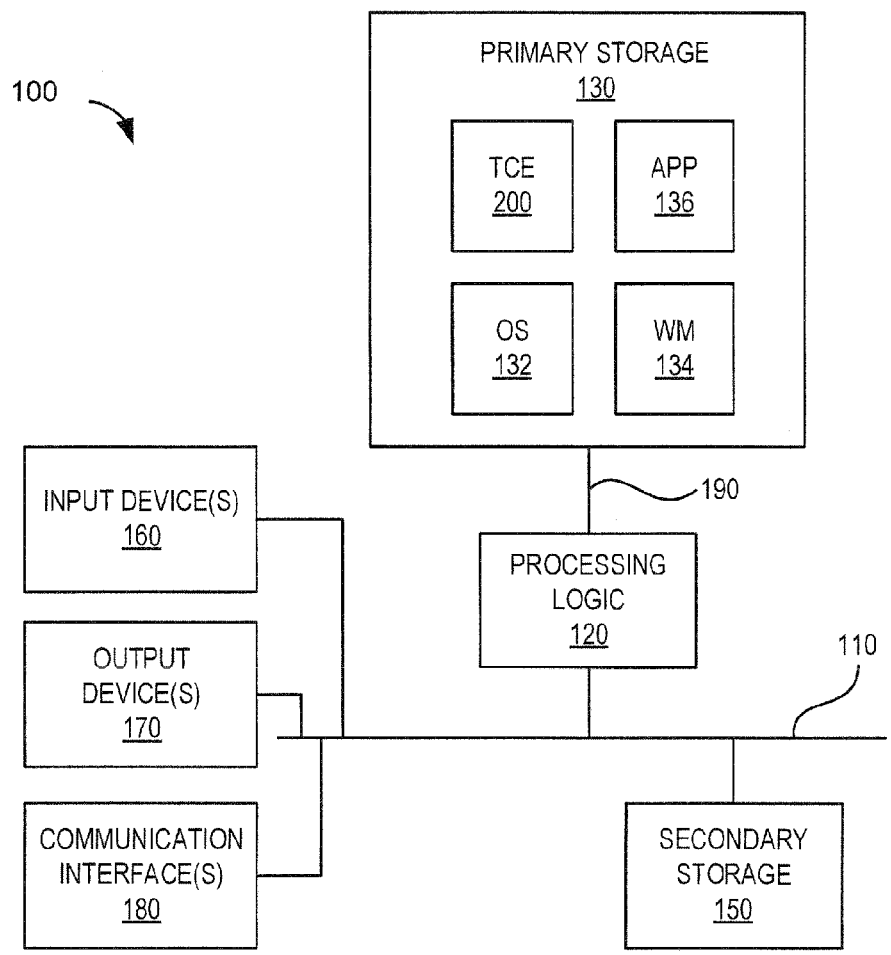
FIG. 1 illustrates a block diagram of an example of a computing device that may implement one or more embodiments of the invention.

The following detailed description refers to the accompanying drawings. The same reference numbers in different drawings may identify the same or similar features illustrated in the drawings.

One or more embodiments of the invention may be implemented on one or more computing devices. The one or more computing devices may be a system or part of a system. The one or more computing devices may include, for example, a desktop computer, laptop computer, client computer, server computer, mainframe computer, personal digital assistant (PDA), netbook computer, tablet computer, web-enabled cellular telephone, smart phone, or some other computing device.

FIG. 1 illustrates a block diagram of an example of a computing device 100 that may implement one or more embodiments of the invention. Referring to FIG. 1, the computing device 100 may include one or more components, such as processing logic 120, primary storage 130, secondary storage 150, one or more input devices 160, one or more output devices 170, and one or more communication interfaces 180, coupled together by one or more buses, such as input-output (I/O) bus 110 and memory bus 190. Note that computing device 100 is an example of a computing device that may implement one or more embodiments of the invention. Other computing devices that may be less complicated or more complicated than computing device 100 may implement one or more embodiments of the invention.

The I/O bus 110 may be an interconnect bus that may enable communication between various components in the computing device 100, such as processing logic 120, secondary storage 150, input device 160, output device 170, and communication interface 180. The communication may include, among other things, transferring information (e.g., data, control information, executable instructions) between the components.

The memory bus 190 may be an interconnect bus that may enable information to be transferred between the processing logic 120 and the primary storage 130. The information may include instructions and/or data that may be executed, manipulated, and/or otherwise processed by processing logic 120. The instructions and/or data may include instructions and/or data that may implement one or more embodiments of the invention.

The processing logic 120 may include logic that may interpret, execute, and/or otherwise process information contained in, for example, the primary storage 130 and/or secondary storage 150. The information may include computer-executable instructions and/or data that may implement one or more embodiments of the invention. The processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processing logic 120 may comprise a single core or multiple cores. Moreover, processing logic 120 may comprise a system-on-chip (SoC) or system-in-package (SiP). An example of a processor that may be used to implement processing logic 120 is the Intel® Xeon® processor available from Intel Corporation, Santa Clara, Calif.

The secondary storage 150 may be a non-transient tangible computer-readable media that is accessible to the processing logic 120 via I/O bus 110. The secondary storage 150 may store information for the processing logic 120. The information may be executed, interpreted, manipulated, and/or otherwise processed by the processing logic 120. The secondary storage 150 may comprise, for example, a storage device, such as a magnetic disk, optical disk, random-access memory (RAM) disk, and/or flash drive. The information may be stored on one or more non-transient tangible computer-readable media contained in the storage device. The media may include, for example, magnetic discs, optical discs, and/or memory devices (e.g., flash memory devices, static RAM (SRAM) devices, dynamic RAM (DRAM) devices, or other memory devices). The information may include data and/or computer-executable instructions that may implement one or more embodiments of the invention.

Input device(s) 160 may include one or more devices that may be used to input information into computing device 100. Devices that may be used to input information into computing device 100 may include, for example, a keyboard (e.g., hardware keyboard, software keyboard), computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, eyeball controlled device, finger mouse, light pen, light gun, neural device, eye tracking device, gesture tracking device, steering wheel, yoke, jog dial, space ball, directional pad, dance pad, soap mouse, haptic device, tactile device, neural device, multipoint input device, discrete pointing device, or some other input device. The information may include spatial (e.g., continuous, multi-dimensional) data that may be input into computing device 100, for example, using a device such as, for example, a computer mouse. The information may also include other forms of data, such as, for example, text that may be input using a keyboard.

Output device(s) 170 may include one or more devices that may output information from the computing device 100. Devices that may output information from the computing device 100 may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, neural stimulation device, printer (e.g., a three-dimensional (3D) printer, laser printer), speaker, video projector, volumetric display device, plotter, actuator (e.g., electrical motor) or some other output device. Output device 170 may be directed by, for example, the processing logic 120, to output the information from the computing device 100. The information may be presented (e.g., displayed, printed) by output device 170. The information may include, for example, graphical user interface (GUI) elements (e.g., windows, widgets, dialog boxes, or other GUI elements), graphical representations, pictures, text, or other information that may be presented by output device 170. Note that the information may be presented on one or more output devices 170 in a stereoscopic view to enable, for example, a perception of depth.

Communication interface(s) 180 may include one or more devices that may include logic for (1) interfacing the computing device 100 with, for example, one or more communication networks and (2) enabling the computing device 100 to communicate with one or more devices connected to the communication networks. An example of a communication network that may be used with computing device 100 will be described further below with respect to FIG. 21.

A communication interface 180 may include one or more transceiver-like mechanisms that may enable the computing device 100 to communicate with devices connected to the communication networks. Examples of a communication interface 180 may include a built-in network adapter, network interface card (NIC), Personal Computer Memory Card International Association (PCMCIA) network card, card bus network adapter, wireless network adapter, Universal Serial Bus (USB) network adapter, modem, or other device suitable for interfacing the computing device 100 to the communication networks.

The primary storage 130 is accessible to the processing logic 120 via bus 190. The primary storage 130 may be a non-transient tangible computer-readable media that may store information for processing logic 120. The information may include computer-executable instructions and/or data that may implement operating system (OS) 132, windows manager (WM) 134, an application 136 (APP), and a technical computing environment (TCE) 200. The instructions may be executed, interpreted, and/or otherwise processed by processing logic 120.

The primary storage 130 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

OS 132 may be a conventional operating system that may implement various conventional operating system functions. These functions may include, for example, scheduling one or more portions of APP 136 and/or TCE 200 to run on the processing logic 120, managing the primary storage 130, controlling access to various components associated with the computing device 100 (e.g., secondary storage 150, input device 160, output device 170, communication interface 180), and controlling access to data received and/or transmitted by these components.

Examples of operating systems that may be used to implement OS 132 may include, but are not limited to, the Linux operating system, Microsoft Windows operating system, the Symbian operating system, Mac OS, Chrome OS, and the Android operating system. A version of the Linux operating system that may be used is Red Hat Linux available from Red Hat Corporation, Raleigh, N.C. Versions of the Microsoft Windows operating system that may be used include Microsoft Windows 7, Microsoft Windows Vista, and Microsoft Windows XP operating systems available from Microsoft Inc., Redmond, Wash. The Chrome OS and Android operating systems are available from Google, Inc., Mountain View, Calif. The Mac OS operating system is available from Apple Inc., Cupertino, Calif. The Symbian operating system is available from the Symbian Foundation, London, United Kingdom.

WM 134 may be a conventional window manager that may manage GUI elements, such as widgets, dialog boxes, and windows, that may be part of the OS 132, TCE 200, and/or APP 136. The GUI elements may be displayed on an output device 170. The WM 134 may also be configured to (1) capture one or more positions of interactions with input device 160 and/or other data associated with the input device 160, and (2) provide the positions and/or data to, for example, OS 132, APP 136, and/or TCE 200. The positions and/or data may be provided in messages that may be sent to the OS 132, APP 136, and/or TCE 200. Examples of window managers that may be used to implement WM 134 may include, but are not limited to, X windows, GNOME, and KDE, which are often used with the Linux operating system, and window managers used with the Microsoft Windows XP, Microsoft Windows Vista, and Microsoft Windows 7 operating systems. It should be noted that other window managers or components that implement various functions associated with window managers may be used to implement WM 134.

APP 136 may be designed to perform a particular task or tasks. APP 136 may be an executable and/or interpretable version of a software application that may be written in a programming language, such as C, C++, Java, or some other programming language. Some or all of APP 136 may be, for example, written by a user of computing device 100, supplied by a vendor, and/or generated by TCE 200. Some or all of APP 136 may operate under the control of OS 132. APP 136 may include computer-executable instructions and/or data that may implement one or more embodiments of the invention.

TCE 200 may be a technical computing environment that may contain provisions for solving one or more problems. As will be described further below, TCE 200 may include a framework that may be used to solve one or more problems. The framework may contain a meta-solver and one or more sub-solvers. Some or all of TCE 200 may operate under the control of OS 132. TCE 200 may include computer-executable instructions and/or data that may implement one or more embodiments of the invention.

Figure 2:
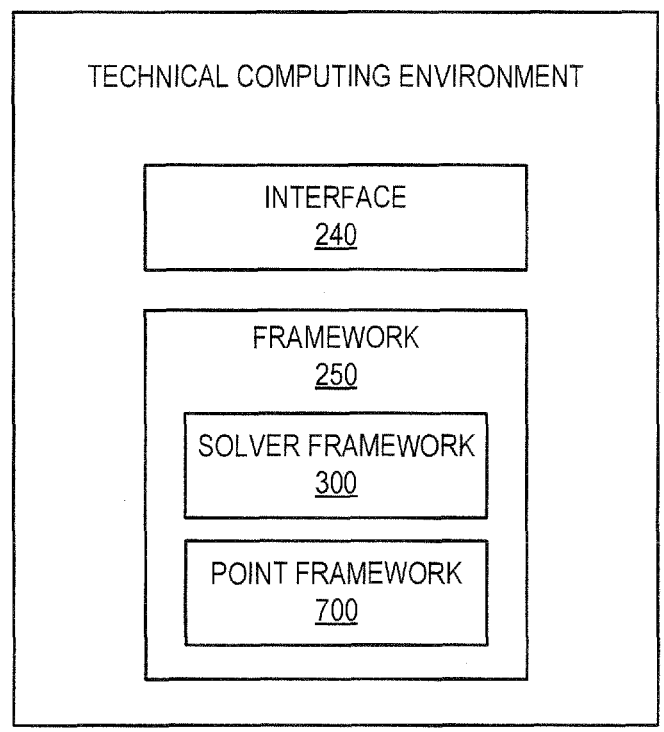
FIG. 2 illustrates a block diagram of an example of a technical computing environment (TCE) that may implement one or more embodiments of the invention.

FIG. 2 illustrates an example embodiment of TCE 200. Referring to FIG. 2, TCE 200 may include an interface 240 and a framework 250. The interface may be used to input/output information to/from the TCE 200. The information may be (1) input into TCE 200 via an input device, such as input device 160 and (2) output from TCE 200 via an output device, such as output device 170. Note that other embodiments of TCE 200 may contain, for example, more components or fewer components than the components illustrated in FIG. 2. Moreover, functions performed by the various components contained in TCE 200 may be distributed among the components differently than described below.

The TCE 200 may include hardware-based and/or software-based logic, which may provide a computing environment that may allow various tasks, related to various disciplines, such as mathematics, science, engineering, mechanics, physics, medicine, business, biology, and/or finance, to be performed. The TCE 200 may include a dynamically-typed programming language (e.g., the MATLAB® language), where a data type of data may be determined at runtime.

The dynamically typed programming language may use an array as a basic data element where the array may not require dimensioning. The array may be used to support array-based programming where an operation may apply to an entire set of values included in the array. Array-based programming may allow array-based operations to be treated as a high-level programming technique that may allow, for example, operations to be performed on entire aggregations of data without having to resort to explicit loops of individual non-array operations.

In addition, the TCE 200 may perform matrix and/or vector formulations that may be used for data analysis, data visualization, application development, simulation, modeling, and/or algorithm development. These matrix and/or vector formulations may be used in many areas, such as mathematics, science, engineering, mechanics, physics, medicine, business, biology, and/or finance.

The TCE 200 may further provide functions and/or tools for generating, for example, plots, surfaces, images, volumetric representations, or other representations. The TCE 200 may provide these functions and/or tools using toolboxes (e.g., toolboxes for signal processing, image processing, data plotting, and/or parallel processing). In addition, the TCE 200 may provide these functions as block sets. The TCE 200 may also provide these functions in other ways, such as via a library or a database.

Examples of TCEs that may be adapted to implement one or more embodiments of the invention may include, but are not limited to, MATLAB®, Simulink®, Stateflow®, Simscape™, SimMechanics™, and SimEvents®, which are available from MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; Advanced Design System, VEE Pro, and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; and Ptolemy from the University of California at Berkeley.

Interface 240 may be a textual and/or graphical interface that may allow, for example, a user, to specify, edit, annotate, save, publish, and/or print information that may be used and/or provided by framework 250. As will be described further below, the information may include a description of a problem (problem description) that may be provided to framework 250. Moreover, interface 240 may contain provisions for generating elements (e.g., objects) of framework 250 and controlling (e.g., establishing settings, starting, stopping) the operation of framework 250. Interface 240 may include a command line interface that may enable one or more commands, which may be used to invoke some or all of the functionality associated with these provisions, to be entered into TCE 200. In addition, interface 240 may contain provisions for outputting information that may be provided by framework 250, such as one or more solutions to a problem that may be found by framework 250. The information may be outputted by interface 240 in the form of, for example, text, graphics, or some combination thereof. Examples of information that may be provided by framework 250 and may be output by interface 240 will be described further below with respect to FIGS. 20A-B.

Framework 250 may be used to, for example, find one or more solutions to a problem. The problem may be related to various disciplines, such as mathematics, science, engineering, mechanics, physics, medicine, business, biology, and/or finance. The framework 250 may contain provisions for: (1) identifying one or more solvers for use in finding one or more solutions to a problem, (2) identifying one or more points (e.g., starting points) that may be used by one or more of the identified solvers, (3) transferring the identified points to the one or more of the identified solvers, (4) acquiring one or more outputs from one or more of the identified solvers, and (5) identifying one or more solutions to the problem based on, for example, the acquired outputs. Framework 250 may include a solver framework 300 and a point framework 700. Note that framework 250 may include other components associated with finding one or more solutions to a problem.

Figure 3:
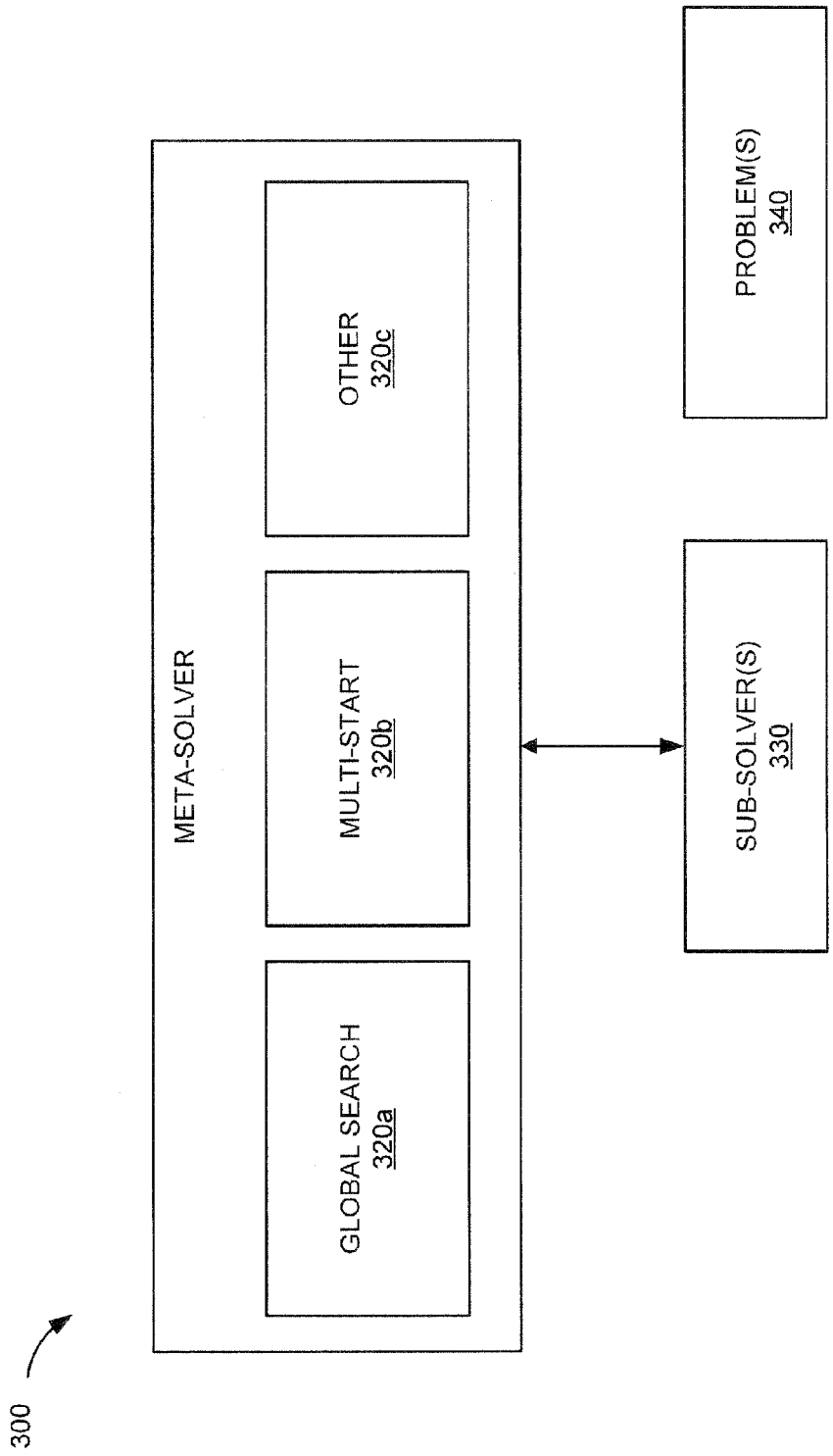
FIG. 3 illustrates a block diagram of an example of a solver framework that may be used to attempt to find one or more solutions to a problem.

FIG. 3 illustrates a block diagram of an example embodiment of solver framework 300. Referring to FIG. 3, solver framework 300 may include one or more meta-solvers 320, one or more sub-solvers 330, and one or more problems 340. The one or more problems 340 may be passed to the framework 300, for example, from a user via an interface, such as interface 240. The problems 340 may be passed in information that may be supplied by the user. Note that one or more of the problems 340 may include, for example, one or more sub-problems.

The meta-solvers 320 may include, for example, a global search meta-solver 320a, a multi-start meta-solver 320b, and/or one or more other meta-solvers 320c. The sub-solvers 330 may include a numeric solver, a symbolic solver, or some other type of solver. Note that framework 300 may include two or more sub-solvers 330 that may be of different types. For example, framework 300 may include a first sub-solver 330 that may be a numeric solver and a second sub-solver 330 that may be a symbolic solver.

A meta-solver 320 may have one or more meta-solver settings. The settings may be used to control a behavior of the meta-solver 320. The settings may include, for example, one or more settings that may (1) control information that may be output from the meta-solver, (2) control a number of attempts made to find one or more solutions to one or more problems 340, (3) specify an amount of time for finding one or more solutions to one or more problems 340, (4) specify one or more tolerances for information (e.g., points) that may be used to find one or more solutions to one or more problems 340, and/or other settings.

Likewise, a sub-solver 330 may have one or more sub-solver settings. These settings may be used to control a behavior of the sub-solver 330.

Figure 4:
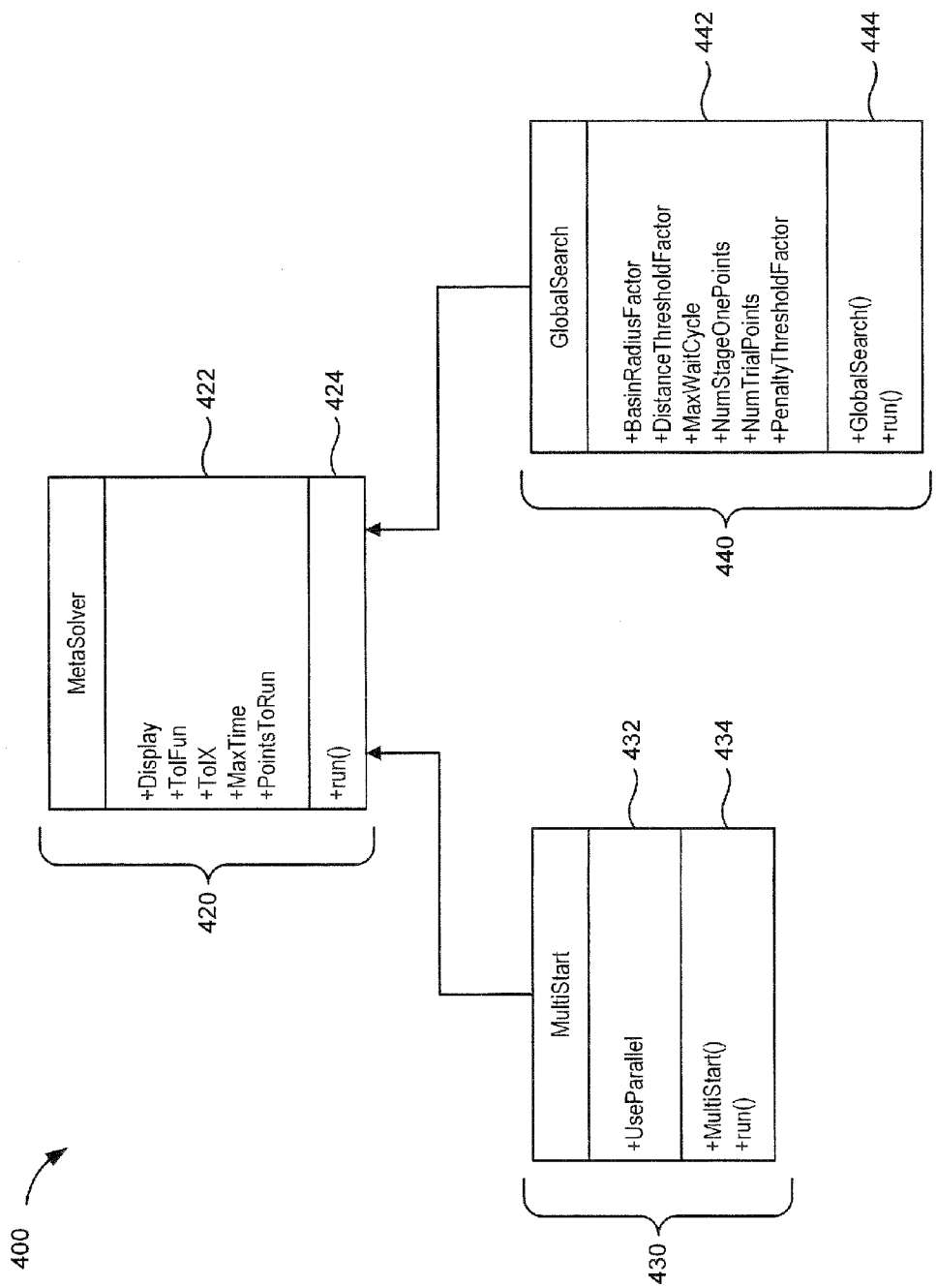
FIG. 4 illustrates a class diagram of example objects that may be included in a solver framework.

The solver framework 300 may be implemented using one or more objects. FIG. 4 illustrates a class diagram 400 of objects that may be included in solver framework 300. Referring to FIG. 4, the class diagram 400 includes a meta-solver (MetaSolver) class 420, a multi-start (MultiStart) class 430, and a global search (GlobalSearch) class 440. The solver framework 300 may include an object that is of the MultiStart class 430 (MultiStart object), and/or an object that is of the GlobalSearch class 440 (GlobalSearch object). Note that classes illustrated in FIG. 4 are an example of classes for objects that may be contained in framework 300. Other embodiments of framework 300 may include other objects that may, for example, implement various functionality associated with framework 300. Some or all of other objects may be based on other class definitions.

The MetaSolver class 420 may define member functions 424 and data members 422 that may be associated with meta-solvers 320 in general. The MetaSolver class 420 may be a parent class of the MultiStart class 430 and the GlobalSearch class 440. Thus, a MultiStart object and a GlobalSearch object may include member functions 424 and data members 422. Note that the MetaSolver class 420 may be a parent class to other meta-solvers 320.

The MetaSolver class 420 may define various data members 422 and member functions 424 that may implement functionality associated with a meta-solver 320. The data members 422 may include a display flag (Display), function tolerance (TolFun), X tolerance (TolX), time limit (Max-Time), and points to run (PointsToRun). The member functions 424 may include a run member function. Note that MetaSolver class 420 may define other data members and/or other member functions.

The Display data member may hold a value that may indicate which information may be outputted by an object derived from the MetaSolver class 420, such as a MultiStart object and a GlobalSearch object. For example, the Display data member may hold a value that may indicate one or more of the following information may be outputted by the object: a global optimum solution to a problem, one or more intermediate results, one or more partial results, status, or other information.

The TolFun data member may hold a value that may be used to determine whether two points are identical in terms of a function value. The MaxTime data member may hold a value that may indicate a maximum amount of time that may be allowed for finding one or more solutions to a problem. The run member function may be used to run (e.g., execute) an object derived from the MetaSolver class 420.

The PointsToRun data member may hold a value that may be used to determine which points in a point set are to be used by one or more sub-solvers that may be called by a MultiStart object or a GlobalSearch object. For example, the PointsToRun data member may indicate that all the points in the point set are to be used, certain points that fall within certain constraints (e.g., bounds, linear inequality constraints, non-linear inequality constraints) are to be used, or some other indication. Note that the point set may include one or more start points that may be used by the one or more sub-solvers. The point set may be part of a point framework, such as point framework 700. Examples of point frameworks will be discussed further below.

The MultiStart class 430 may be a child class of the MetaSolver class 420. The MultiStart class 430 may define data members 432 and member functions 434 that may be specific to the MultiStart class 430. The data members 432 may include, for example, a parallelization flag data member (UseParallel). The member functions 434 may include, for example, a constructor function (MultiStart) and a run function (run). Note that the MultiStart class 430 may define other data members and/or member functions.

The UseParallel data member may hold a value that may indicate whether, for example, sub-solvers, called by a MultiStart object, may execute in parallel. For example, execution of the sub-solvers may be distributed among a plurality of processors. The flag may indicate, for example, that the sub-solvers (1) may always execute in parallel, (2) may never execute in parallel, or some other indication.

The MultiStart function may be used as a constructor function for a MultiStart object. The MultiStart function may initialize one or more values of one or more data members associated with the MultiStart object.

The run member function may be used to run a MultiStart object. Running the MultiStart object may include invoking (calling) one or more sub-solvers to attempt to find one or more solutions to a problem. The run member function may take various inputs. The inputs may include, for example, a problem description, a value that indicates a number of points in a point set, and/or the point set. One or more points in the point set may be used by the sub-solver as starting points. The run member function may return an output. The output may be represented as an array. An example of an output that may be returned by the run member function will be described below with respect to FIG. 17.

The GlobalSearch class 440 may also be a child class of the MetaSolver class 420. The GlobalSearch class 440 may define data members 442 and member functions 444 that may be specific to the GlobalSearch class 440. The data members 442 may include, for example, a basin radius factor (BasinRadiusFactor), distance threshold factor (DistanceThresholdFactor), maximum wait cycle (MaxWaitCycle), number of stage one points (NumStageOnePoints), number of trial points (NumTrialPoints), and a penalty threshold factor (PenaltyThresholdFactor). The member functions 444 may include, for example, a constructor function (GlobalSearch) and a run function (run). Note that the GlobalSearch class 440 may contain other data members and/or member functions.

The BasinRadiusFactor data member may hold a value that may indicate an amount that a given basin of attraction radius may be decreased when a certain number of consecutive trial points lie within a basin. The DistanceThresholdFactor data member may hold a value that may be used to tune an effect of a distance filter. During a run of a GlobalSearch object, a trial point may have to pass various tests before the GlobalSearch object starts a sub-solver from that point. The tests may include a distance test. The DistanceThresholdFactor data member may be used to determine if the trial point passes the the distance test. For example, the test may include determining if the following holds given a trial point T and a solution already located L:

Distance between $T$ and
$L(i)<=\text{DistanceThresholdFactor}*\text{maxdist}(i)$ where maxdist(i) is an estimate of a basin radius for an i-th local solution. If the above holds, then trial point T may be said to lie in a basin of attraction to solution L.

The MaxWaitCycle data member may hold a value that may be used to determine a maximum number of consecutive trial points for various tests. These tests may include a test that determines whether a threshold value, that may be used to determine whether a trial point is rejected, is adjusted. For example, the trial point may be rejected if a penalty function value at this point is greater than the threshold value. The threshold value may be adjusted if MaxWaitCycle consecutive trial points have been rejected because a penalty function value is greater than a threshold. Another test may include determining whether a radius of a basin of attraction of a located minimum is adjusted. For example, if MaxWaitCycle consecutive trial points lie within a basin, then the radius of the basin may be adjusted (e.g., reduced).

The NumStageOnePoints data member may hold a value that may indicate, for example, a number of points that may be analyzed during a first stage of running a GlobalSearch object. After analyzing the number of points, the GlobalSearch object may choose a best quality point from points that have been analyzed. The best quality point may be passed to a sub-solver that may be called by the GlobalSearch object.

The NumTrialPoints data member may be used to hold a value that may represent a number of trial points that are generated from, for example, a scatter search algorithm. The PenaltyThresholdFactor data member may hold a value that may represent an amount by which the above-described threshold value is adjusted.

The GlobalSearch function may be used as a constructor function for a GlobalSearch object. The GlobalSearch function may initialize one or more values of one or more data members associated with the GlobalSearch object.

The run member function may be used to run a GlobalSearch object. Running the GlobalSearch object may include invoking one or more sub-solvers associated with the GlobalSearch object. A sub-solver may be a gradient-based non-linear programming (NLP) solver. The GlobalSearch object may attempt to find a "global" solution to general (smooth) NLP problems. The global solution may be found, for example, using a combination of a domain searching heuristic and the sub-solver. The domain searching heuristic may employ, for example, a scatter search technique that may involve generating candidate points using scatter search. The points may be analyzed and the sub-solver may be started from a point if the point meets certain criteria (e.g., passes certain tests, such as one or more of the tests described above). The run member function may return an output that represents one or more solutions found by the sub-solver. The output may be represented as an array. An example of an output that may be returned by the run member function will be described below with respect to FIG. 17.

Figure 5:
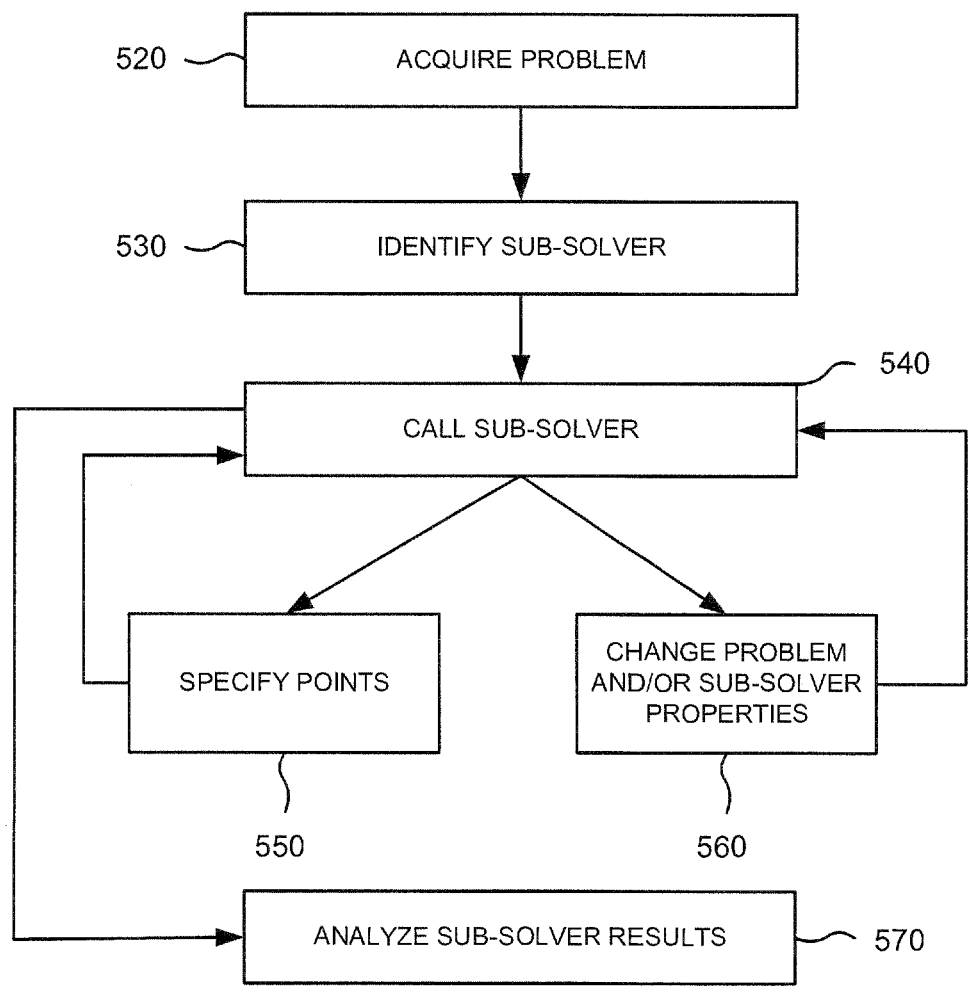
FIG. 5 illustrates a flow chart of an example acts that may be performed to attempt to find a solution to a problem using a meta-solver.

FIG. 5 illustrates a flow chart of example acts that may be performed by a meta-solver. Referring to FIG. 5, at block 520, information used by the meta-solver may be acquired. The information may be acquired via an interface, such as interface 240, from a database, a file, via a communications network, or some other source. The information may include, for example, a problem description that may describe a problem to be solved by the meta-solver.

The problem description may include, for example, an identifier, objective function, default start point, linear inequality constraint, linear inequality constraint bounds, linear equality constraint, linear equality constraint bounds, lower bounds, upper bounds, constraint function, solver options, partial differential equations, differential equations, descriptions of one or more events that may be used for an event-based simulation, variable types, and/or other information that may be relevant to the problem. The problem description may be represented in a data structure that may be contained in the information.

The identifier may be used to identify a sub-solver that may be called by the meta-solver. For example, the identifier may be a data string that holds a name associated with the sub-solver. Note that the identifier may identify the sub-solver in other ways.

The objective function may be a function that may be called by a sub-solver. The sub-solver may be called by the meta-solver. The objective function may be represented in the information as a handle of (e.g., pointer to, identifier of) the function.

The default start point that may be a start point that may be used by a sub-solver, for example, if a start point is not provided to the sub-solver.

The linear inequality constraint and linear equality constraint may be constraints that may be applied to the start point used by a sub-solver that may be called by the meta-solver. The linear inequality constraint and linear equality constraint may be represented in the information as arrays.

The linear inequality constraint bounds and linear equality constraint bounds may be bounds that may be applied to the linear inequality constraint and linear equality constraint, respectively. The linear inequality constraint and linear equality constraint may be represented in the structure as arrays. The linear inequality bounds and linear equality bounds may be represented in the structure as vectors.

The lower bounds may include a set of lower bounds on one or more variables (X), used by a sub-solver, such that a solution that satisfies X may be greater than or equal to a corresponding lower bound in the set of lower bounds. The sub-solver may be called by the meta-solver. The upper bounds may be a set of upper bounds on the variables X such that a solution that satisfies X may be less than or equal to a corresponding upper bound in the set of upper bounds. The lower and upper bounds may be represented in the structure as arrays.

The constraint function may be a function that returns one or more values that represent one or more nonlinear inequality and/or equality constraints. The function may be represented in the structure as a handle.

The solver options may include one or more options that may be passed to a sub-solver that may be called by the meta-solver. The options may be used to control certain behaviors of the sub-solver. The solver options may be represented in the structure as data that may hold one or more settings of the various options.

At block 530, a sub-solver may be identified by the meta-solver. The sub-solver may be identified, for example, by analyzing the problem description and identifying the sub-solver based on information contained in the problem description. Note that other ways of identifying the sub-solver may be used.

At block 540, the identified sub-solver may be called by the meta-solver, in an attempt to find a solution to the problem. The sub-solver may be called with a point from a point set that may specify a starting point for the sub-solver.

At block 550, an output of the sub-solver may be used, for example, by the meta-solver, to identify one or more points for the sub-solver. The sub-solver may be called by the meta-solver to perform an attempt at finding a solution to the problem using the identified points.

At block 560, an output of the sub-solver may be used, for example, by the meta-solver to alter the problem and/or one or more sub-solver settings. The sub-solver may likewise be called by the meta-solver after these alterations. The acts at blocks 540 through 560 may be repeated until (1) one or more solutions are found, (2) a certain time has elapsed, (3) a number of iterations have been performed, or some other condition. At block 570, one or more results (e.g., solutions) returned by the sub-solver may be analyzed, for example, by the meta-solver to identify an optimal solution to the problem. The identified optimal solution may be returned by the meta-solver.

Figure 6A:
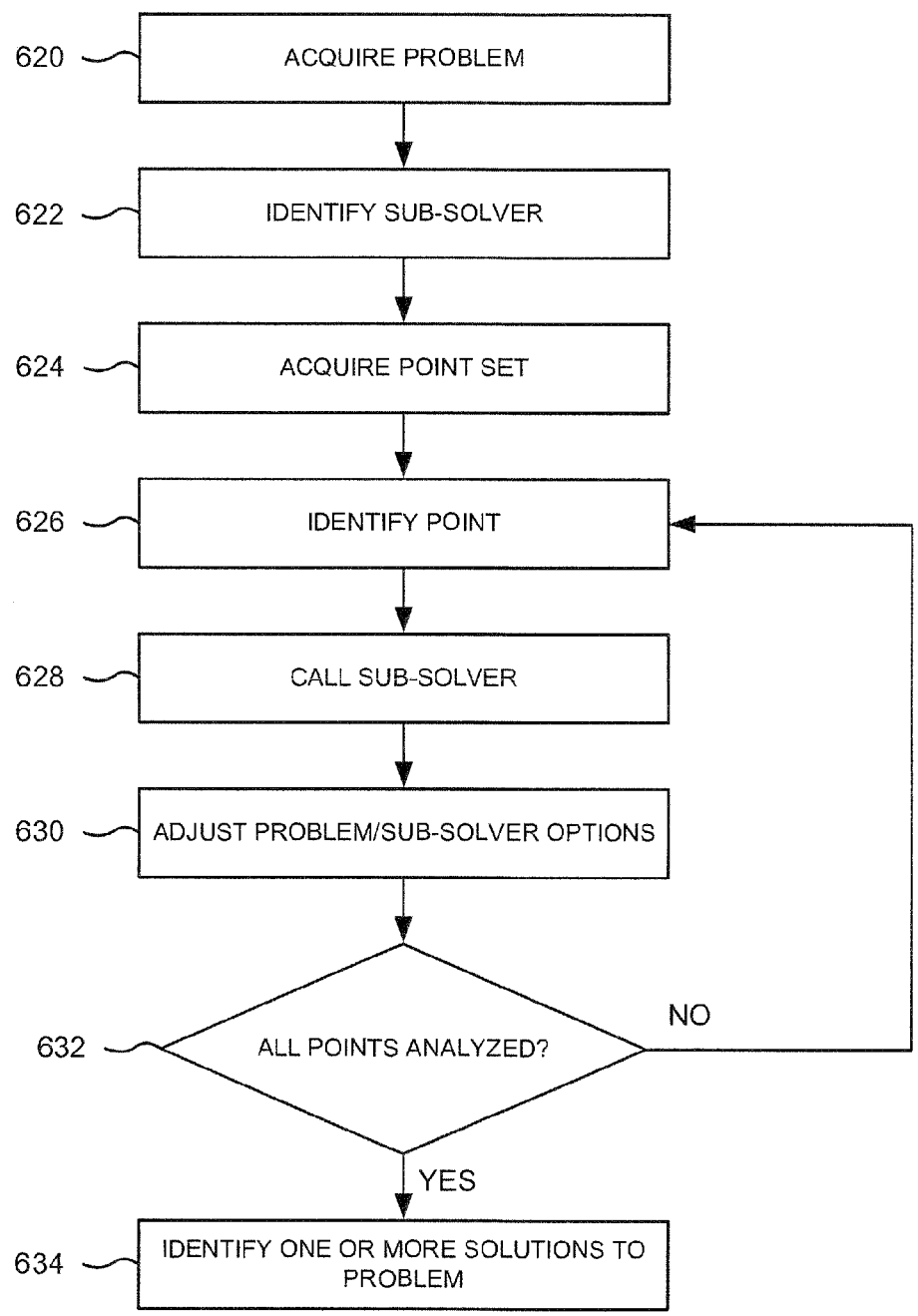
FIGS. 6A-C illustrate flow charts of example acts that may be performed to attempt to find a solution to a problem using a meta-solver.

FIG. 6A illustrates a flow chart of example acts that may be performed by a MultiStart meta-solver 320b. Referring to FIG. 6A, at block 620, a problem to be solved by the MultiStart meta-solver 320b may be acquired. The problem may be in the form of, for example, a problem description, such as described above. The problem description may be represented as a structure, also as described above.

At block 622, a sub-solver is identified. For example, the sub-solver may be identified from the acquired problem. Here, the acquired problem may contain an identifier that may be used to identify the sub-solver. Note that other ways of identifying the sub-solver may be used.

At block 624, a point set is acquired. The point set may include one or more points that may be used as starting points by the sub-solver to find one or more solutions to the problem. The point set may be acquired from a point framework, such as point framework 700, which will be described further below.

At block 626, a point is identified for the identified sub-solver. The point may be identified from the acquired point set. The point may be a start point that may be used by the sub-solver.

At block 628, the identified sub-solver is called. The sub-solver may be an object and may be called by invoking a run function associated with the object. The point identified at block 626 may be passed to the sub-solver in the call to the sub-solver. Moreover, some or all of the acquired problem may be passed to the sub-solver. The sub-solver may return a result to the MultiStart meta-solver 320b. The result may include (1) a status, which may indicate whether the sub-solver was able to find a solution to the problem, and (2) one or more solutions to the problem that may have been found by the sub-solver.

At block 630, a result returned by the sub-solver may be analyzed by, for example, the meta-solver. The MultiStart meta-solver 320b may adjust the sub-solver (e.g., change one or more of the sub-solver's options) and/or the problem based on a result of the analysis. At block 632, a check may be performed to determine whether all of the points in the acquired point set to be used by the sub-solver have indeed been used by the sub-solver. If not, acts at blocks 626 through 632 are repeated in a next attempt to find another solution. At block 626, the result returned by the sub-solver may be used, in part, to identify another point in the point set to be used by the sub-solver in the next attempt.

If at block 632, all of the points in the point set to be analyzed have indeed been analyzed, at block 636, one or more results returned by the sub-solver may be analyzed to identify one or more solutions to the problem. The identified one or more solutions may be returned by the MultiStart meta-solver 320b. As will be described below, the one or more solutions may be returned in an array of objects.

Figure 6B:
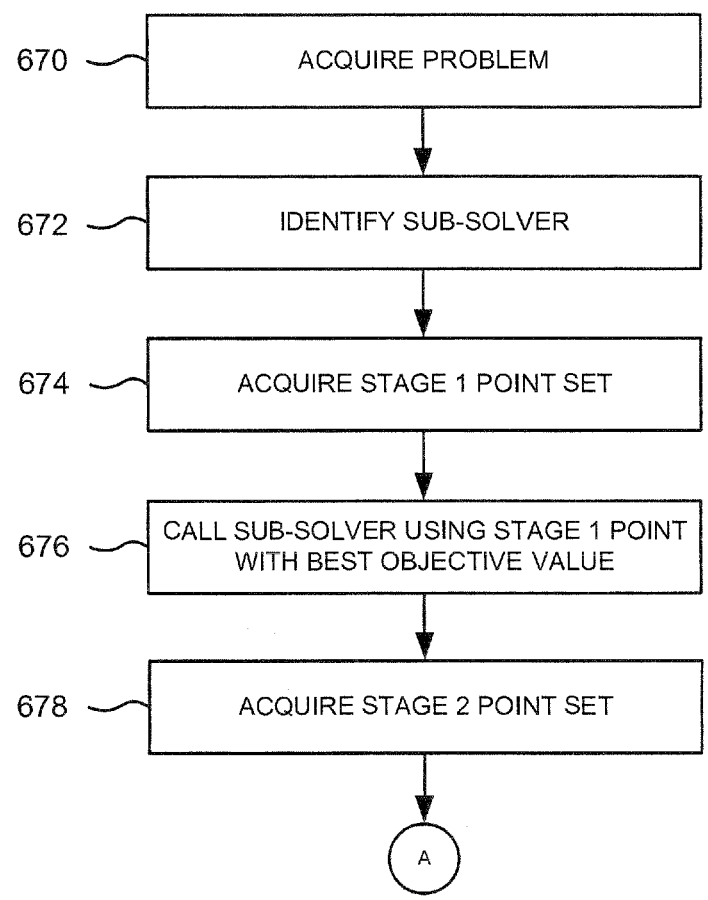

FIG. 6B illustrates a flow chart of example acts that may be performed by a GlobalSearch meta-solver 320a. Referring to FIG. 6B, at block 670, a problem to be solved by the GlobalSearch meta-solver 320a may be acquired. The problem may include, for example, a problem description that may describe the problem, as described above. The problem description may be represented as a structure, also as described above.

At block 672, a sub-solver is identified. The sub-solver may be identified by, for example, from the acquired problem, such as described above. Note that other ways of identifying the sub-solver may be used.

At block 674, a point set is acquired for a first stage (stage 1 point set) of finding one or more solutions to the problem by the GlobalSearch meta-solver 320a. The stage 1 point set may include one or more points that may be used as starting points by the sub-solver to find one or more solutions to the problem during the first stage. The stage 1 point set may be acquired from a point framework, such as point framework 700.

At block 676, the stage 1 point set may be analyzed to identify a stage 1 point that may have a best objective value. The best objective value may relate to a point in the stage 1 point set that is likely to produce a solution to the problem.

Note that other criteria may be used to identify the stage 1 point. The GlobalSearch meta-solver 320*a* may call the identified sub-solver and pass the identified stage 1 point to the sub-solver.

At block 678, a point set is acquired for a second stage (stage 2 point set) of finding one or more solutions to the problem by the GlobalSearch meta-solver 320*a*. The stage 2 point set may include one or more points that may be used as starting points by the sub-solver to find one or more solutions to the problem during the second stage. The stage 2 point set may be acquired from a point framework, such as point framework 700.

Figure 6C:
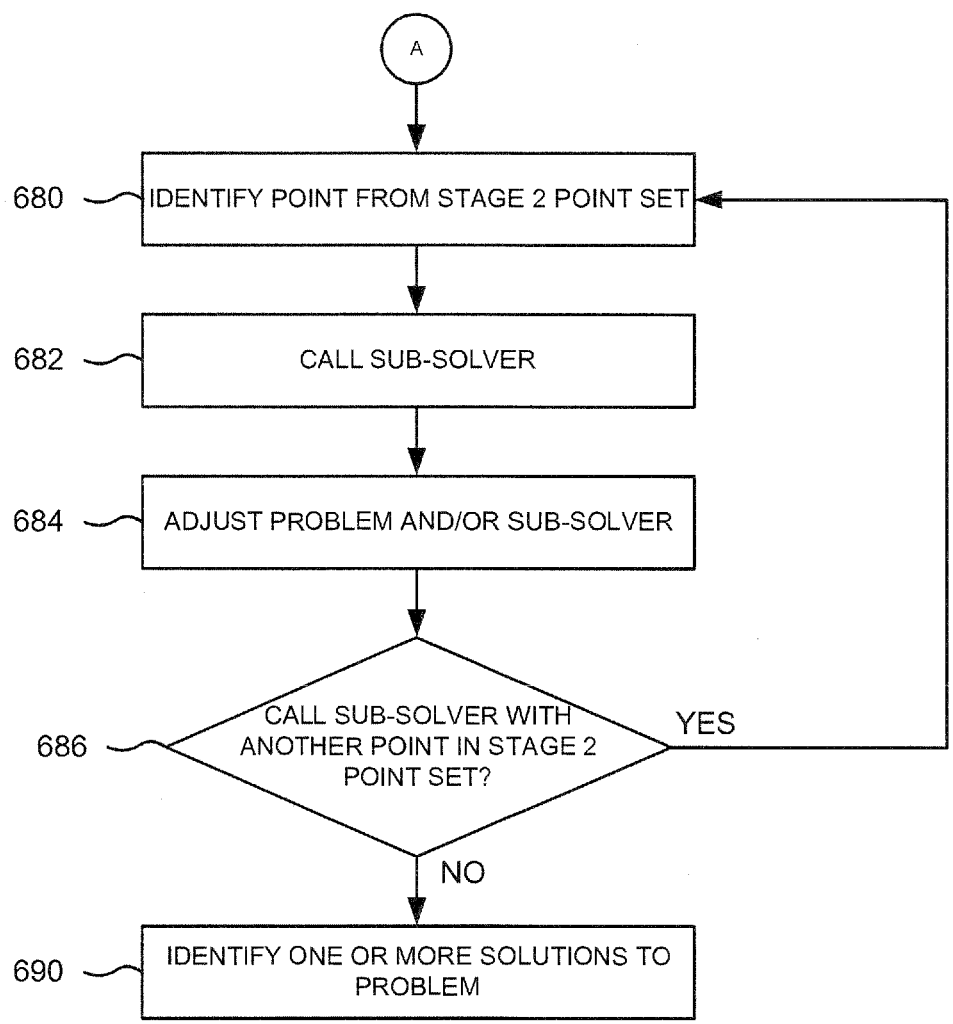

At block 680 (FIG. 6C), a stage 2 point may be identified from the acquired stage 2 point set. Identifying the point may include analyzing the stage 2 point set to identify a point that may have a best objective value. Note that other criteria may be used to identify the stage 2 point. At block 682, the GlobalSearch meta-solver 320*a* may call the identified sub-solver and pass the identified stage 2 point to the sub-solver.

At block 684, the GlobalSearch meta-solver 320*a* may receive a result from the sub-solver and adjust the sub-solver (e.g., change one or more of the sub-solver's options) and/or the problem based on the result. For example, the result may include a solution found by the sub-solver and/or a status (e.g., whether the sub-solver found a solution). The GlobalSearch meta-solver 320*a* may adjust the sub-solver and/or problem based on the solution and/or status.

At block 686, a check may be performed to determine whether the sub-solver should be called with another stage 2 point in the stage 2 point set. If so, acts at blocks 680 through 686 may be repeated in a next attempt to find another solution using a different stage 2 point in the stage 2 point set. At block 680, the result returned by the sub-solver may be used, for example, to identify the other stage 2 point in the stage 2 point set.

If at block 686, it is determined the sub-solver should not be called with another stage 2 point, at block 690, one or more results returned by the sub-solver may be analyzed to identify one or more solutions to the problem. The identified one or more solutions may be returned by the GlobalSearch meta-solver 320*a*. As will be described below, the one or more solutions may be returned in an array of objects.

A behavior of a meta-solver may be described by one or more member functions associated with the meta-solver. One or more settings associated with the meta-solver may be used to tune the meta-solver and/or define the meta-solver's interaction with, for example, a user.

A problem description and a sub-solver, that may be called by the meta-solver, may be wrapped in a container. The container may be passed to an instance of the meta-solver to attempt to solve a problem defined by the problem description.

A meta-solver may attempt to find a solution to a problem in a particular search space defined by the problem. The search space may be defined by information that may be included in a problem description of the problem. For example, the problem description may include bounds that may be used to define the search space. The meta-solver may pass these bounds to a point framework, such as point framework 700. The point framework may use the bounds to identify one or more points for the meta-solver. The meta-solver may transfer one or more of the identified points to one or more sub-solvers that may be called by the meta-solver. The sub-solvers may use the transferred points as start points for one or more attempts to find one or more solutions to the problem.

FIG. 7 illustrates a block diagram of an example embodiment of point framework 700. Point framework 700 may be used to identify one or more points (e.g., start points) for one or more sub-solvers, such as sub-solvers 330. Referring to FIG. 7, point framework 700 may contain a point set 720. Points in the point set 720 may be derived from some combination of points contained in a random point set 730, a custom point set 740, or some other point set 750. Settings 732, 742, and 752 may be used to define a behavior of point sets 730, 740, and 750, respectively. For example, one or more settings in the random point set settings 732 may be used to specify a random point generator that may be used to generate points for the random point set 730. Moreover, settings 732 may specify one or more settings (e.g., a seed value) for the random point generator. Similarly, one or more settings in the custom point set settings 742 may be used to define bounds (e.g., an upper bound, lower bound) for points contained in the custom point set 740.

Figure 8:
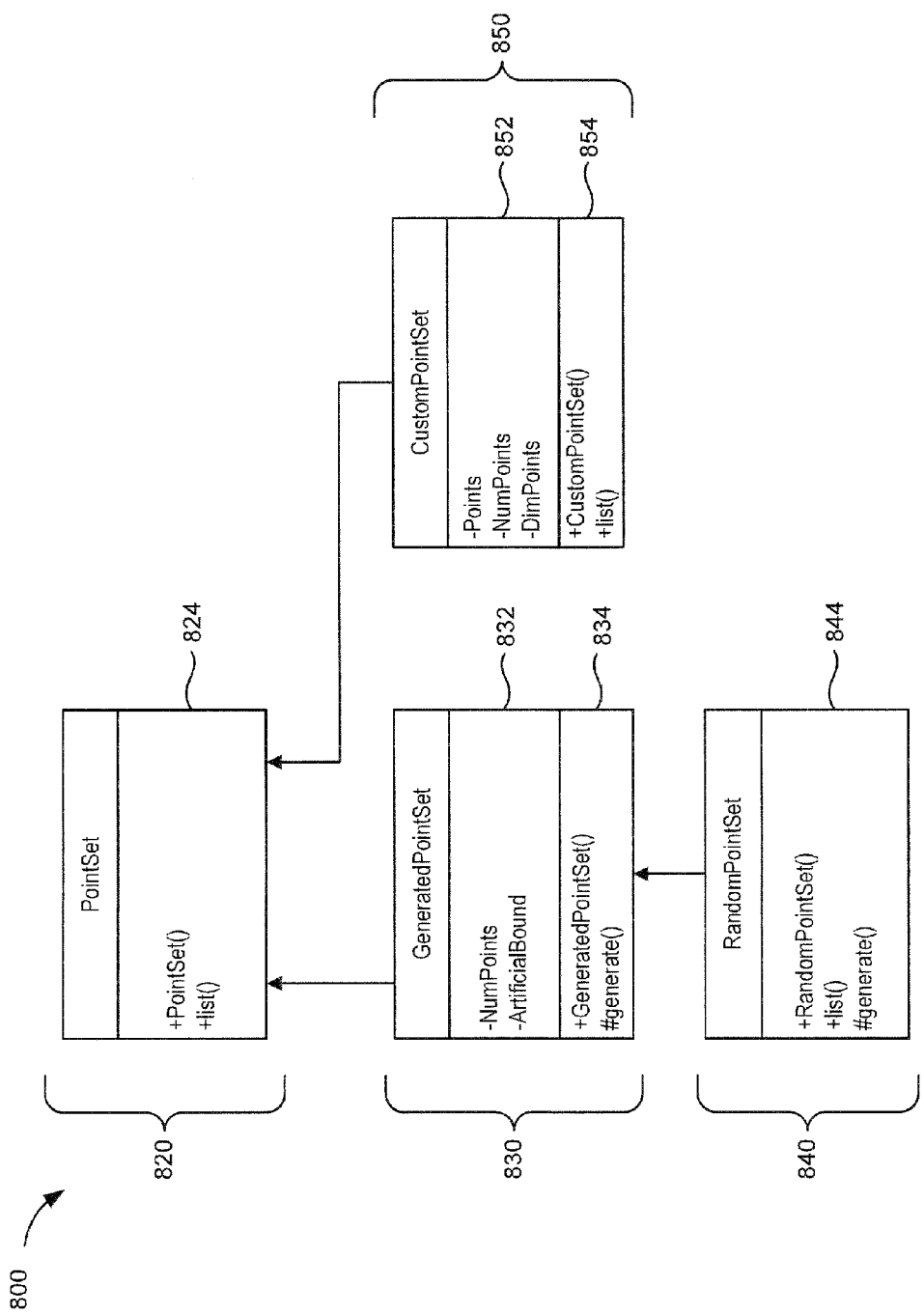
FIG. 8 illustrates a class diagram of example objects that may be included in a point framework.

An embodiment of point framework 700 may be implemented using one or more objects that may contain data members and member functions. FIG. 8 illustrates a class diagram 800 of example objects that may be included in point framework 700. Referring to FIG. 8, class diagram 800 includes a point set (PointSet) class 820, a generated point set (GeneratedPointSet) class 830, a random point set (RandomPointSet) class 840, and a custom point set (CustomPointSet) class 850.

An object of the RandomPointSet class 840 (RandomPointSet object) or an object of the CustomPointSet class 850 (CustomPointSet object) may include member functions 824 defined by the PointSet class 820. The member functions 824 may include a constructor (PointSet) member function, and a list member function (list). Note that the PointSet class 820 may define various data members and/or other member functions for a RandomPointSet object and/or a CustomPointSet object.

The PointSet member function may be a constructor function. The PointSet member function may be called during a construction of a RandomPointSet object or a CustomPointSet object. The PointSet member function may initialize one or more values of one or more data members associated with these objects. The list member function may output one or more points.

A RandomPointSet object may include data members 832 and member functions 834 that may be defined by the GeneratedPointSet class 830. The data members 832 may include a number of points (NumPoints) data member and an artificial bound (ArtificialBound) data member. The member functions 834 may include a constructor (GeneratedPointSet) member function and a generate (generate) member function. The NumPoints data member may be used to specify a number of points to be generated for a point set. The points may be generated when the generate member function is called. The ArtificialBound data member may be used to specify, for example, one or more bounds for the generated points.

The GeneratedPointSet member function may initialize one or more values of one or more data members associated with the RandomPointSet object. The data members may include data members 832. The generate member function may be called to generate one or more points for point framework, such as point framework 700. Note other data members and/or member functions may be defined for class 830.

A RandomPointSet object may include member functions 844 that may be defined by the RandomPointSet class 840. The member functions 844 may include a constructor (RandomPointSet) member function, a list (list) member function, and a generate (generate) member function. The RandomPointSet member function may be called during a construction of the RandomPointSet object. The RandomPointSet member function may initialize one or more values of one or more data members associated with the RandomPointSet object. The generate member function may generate one or more points for a point framework, such as point framework 700. The generated points may be random. The list member function may output one or more generated points.

As indicated in the CustomPointSet class 850, a CustomPointSet object may include various data members 852 and member functions 854. The data members 852 may include a points (Points) data member, a number of points (NumPoints) data member, and a dimension of points (DimPoints) data member. The member functions 854 may include a constructor (CustomPointSet) member function and a list (list) member function. Note that the CustomPointSet object may include other data members and/or member functions.

The Points data member may hold one or more points associated with the CustomPointSet object. The one or more points may be held in an array. The one or more points may be, for example, specified by a user, generated by a function, or otherwise defined. The NumPoints data member may hold a value that may represent a number of points held by the Points data member. The DimPoints data member may hold a value that may be associated with a dimensionality of the Points data member. For example, the Points data member may be an array and the DimPoints data member may hold a vector that may hold the dimensions of the array.

The CustomPointSet member function may be a constructor function that may be called when the CustomPointSet object is constructed. The CustomPointSet member function may be used to initialize one or more values of one or more data members associated with the CustomPointSet object. The list member function may be used to output one or more points that may be contained in the Points data member.

Figure 9:
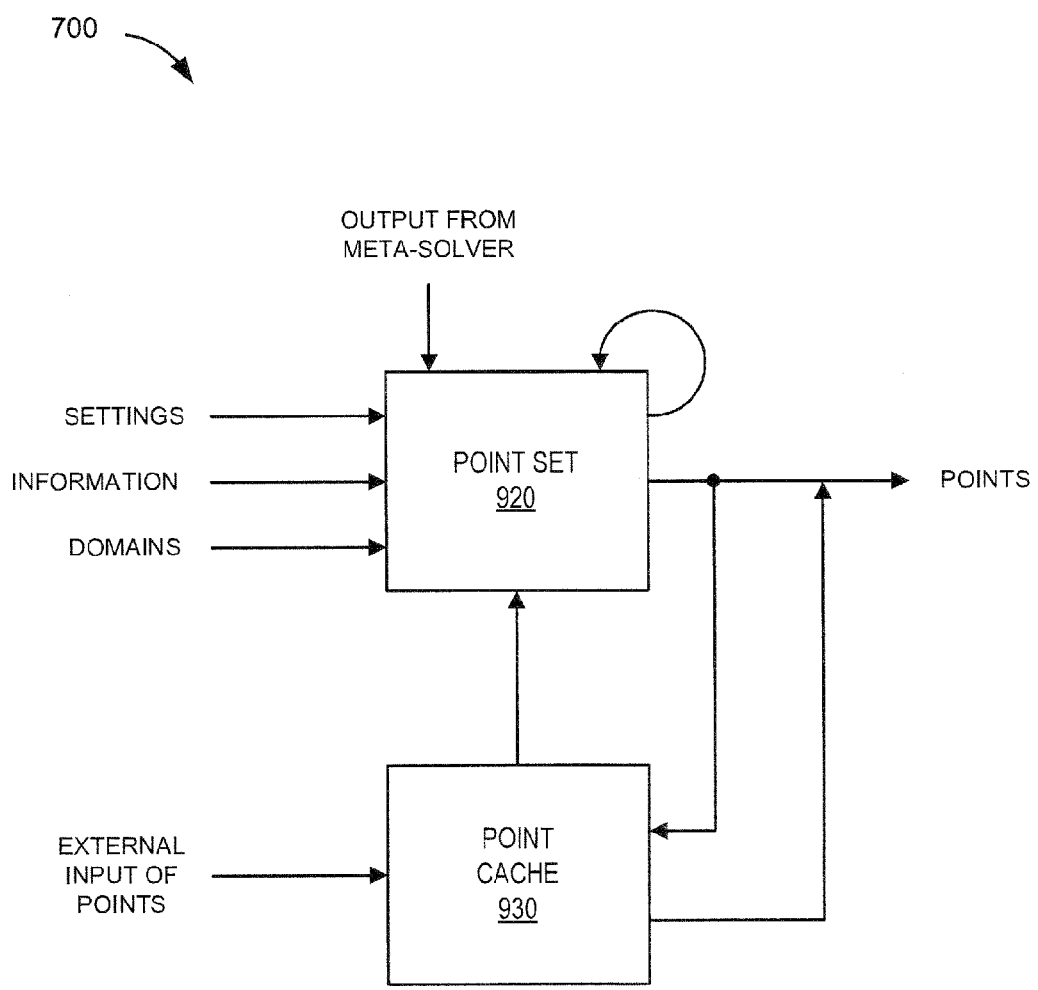
FIG. 9 illustrates a block diagram of an example of a point framework that includes a point cache.

FIG. 9 illustrates a block diagram of an example embodiment of point framework 700. Referring to FIG. 9, the point framework 700 may include a point set 920 and a point cache 930.

The point set 920 may include one or more points that may be used by the solver framework 300. The points may be used as starting points for one or more sub-solvers that may be called by meta-solvers in the framework 300. The points may be, for example, (1) generated using a generator function (e.g., a random number generator function), (2) specified by a user, (3) generated based on previously generated points, or otherwise defined. Moreover, the points may be generated using various objects, such as objects described above with respect to FIG. 8. As will be described further below, the point set may be implemented as an object that may include a member function that may output one or more points in the point set 920.

The point set 920 may have one or more settings. Examples of settings may include, but are not limited to, a dimension of an array that holds points in the point set 920, a number of points output by the point set 920, a lower and/or upper bounds for points generated by the point set 920, a set of one or more generator functions that may be used to generate the points, and/or other settings. The point set 920 may output one or more of the points to the solver framework 300. Moreover, one or more of the points may be output to the point cache 930.

The points may be stored by point set 920 in a variety of ways. For example, the points may be stored as raw data, text files, spreadsheet files, a database, and/or some other way. One or more of the points may be output by the point set 920. For example, the point set 920 may be implemented as an object that may include a member function that may be called from outside the object. The member function may output (return) one or more of the points to the caller.

The point cache 930 may store one or more of points that may be output and/or used by the point set 920. One or more of the points in the cache 930 may be generated by the point set 920. Moreover, one or more of the points in the point cache 930 may be generated/specified externally from the point framework 700. For example, one or more of the points in the point cache may be specified by a user via an interface, such as interface 240. Likewise, for example, one or more points in the point cache 930 may be acquired from a database, file, a communications network, or some other source that may be external from the point framework 700.

The point cache 930 may be used to store a history of points. For example, the point cache 930 may be used to store a history of points that have been output from the point set 920 to solver framework 300. Moreover, the point cache 930 may be used to store a history of points that have been generated by the point set 920. Note that other histories associated with the points may be stored by the point cache 930. The point set 920 may utilize this history to, for example, generate future points that may be output by the point set 920. For example, the point set 920 may utilize this history to generate points that are not duplicates of points that have already been generated and/or generate points that may maximize a distance between points.

The solver framework 300 may request points from the point set 920. In response to the request, the point set 920 may output one or more points to the solver framework 300. The one or more points that may be output may be generated based on, for example, one or more settings associated with the point set 920 and/or information passed to the point set 920 from the solver framework 300. This information may include, for example, an optimization problem, sub-solver/meta-solver information (e.g., settings), one or more generator functions, a subset of previous points, previous solutions from a meta-solver, and/or other information.

Other information may be passed to the point set 920. This information may include a problem description. The problem description may include, for example, an upper and/or lower bounds, an objective function, a non-linear constraint function, a default start point, one or more linear constraints, one or more bounds, an identity of a sub-solver, one or more options (e.g., sub-solver options) and/or other information. This other information that may be passed to the point set 920 may be used by the point set 920 to generate one or more points that may be output by the point set 920.

In addition, one or more domains may be input into the point set 920. A domain may be a subset of an entire search space in which a meta-solver may use in an attempt to find one or more solutions to a problem. The domains may be unrestricted. For example, the domains may overlap and/or more than one domain may exist. Furthermore, a one-to-one correspondence between a domain and a problem may not necessarily exist. Moreover, a domain may or may not include a solution space for a problem. An example of a domain space that includes a solution space will be described further below with respect to FIG. 16.

Figure 10:
FIG. 10 illustrates an example of a data format that may be used to store a point set.

FIG. 10 illustrates an example embodiment of a storage 1000 that may be used to hold a point set. Referring to FIG. 10, the storage 1000 may be organized as an array. As an example, the array may include eight points where each point may be 3-dimensional. The points may include one or more start points that may used, for example, by one or more sub-solvers 330 in solver framework 300.

FIG. 11 illustrates a class diagram 1100 of an object (PointCache object) that may implement a point cache, such as point cache 930. Referring to FIG. 11, the PointCache object may include one or more data members 1132 and one or more member functions 1134 that may implement functionality associated with the point cache. The data members 1132 may include a points data member (Points) which may hold points in the cache. The member functions 1134 may include a plot member function (plot), a display member function (display), an analyze member function (analyze), and a get points member function (getPoints). Note that a PointCache object may contain other data members and/or functions than those illustrated in FIG. 11.

The plot member function may present a graphical display of one or more points held by the Points data member. The graphical display may include one or more graphical plots of the points. The one or more of the plots may be built into a TCE, such as TCE 200. Likewise, one or one more of the plots may be custom plots that may be specified, for example, by a user. The display member function may present, for example, a textual display of one or more points held by the Points data member. The one or more points may be displayed in response to a command provided, for example, by a user. The analyze member function may analyze one or more points held by the Points data member. One or more functions used to analyze the points may be built into the TCE and/or externally specified (e.g., by a user). The getPoints member function may retrieve one or more points from the Points data member. The points may be output from the PointCache object to a caller. For example, the PointSet object may call the getPoints member function to retrieve one or more points from the Points data member in the PointCache object.

Figure 12:
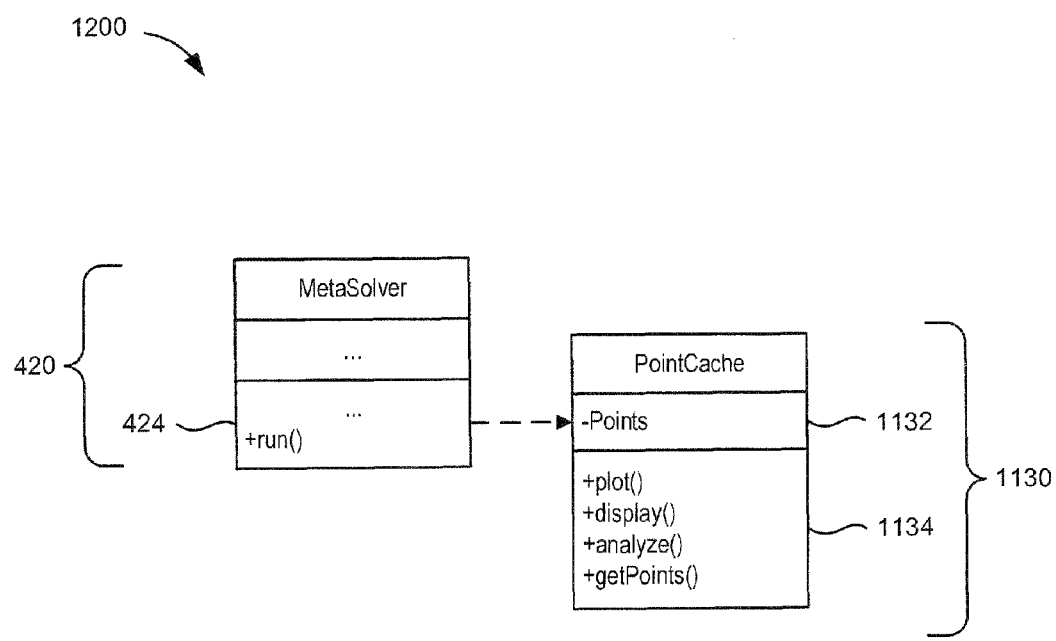
FIG. 12 illustrates a class diagram of example objects that may be included in a framework where a solver may generate an object that may implement a point cache.

The PointCache object may be created by a meta-solver, such as meta-solver 320. FIG. 12 illustrates a class diagram 1200 that shows a use dependency between a MetaSolver object and a pointCache object. Referring to FIG. 12, the MetaSolver object may include a run member function (run) which may be used to run the MetaSolver object. When invoked, the run member function may create the PointCache object. Note that the MetaSolver object's run member function may also be used to access one or more points in the PointCache object.

Figure 13:
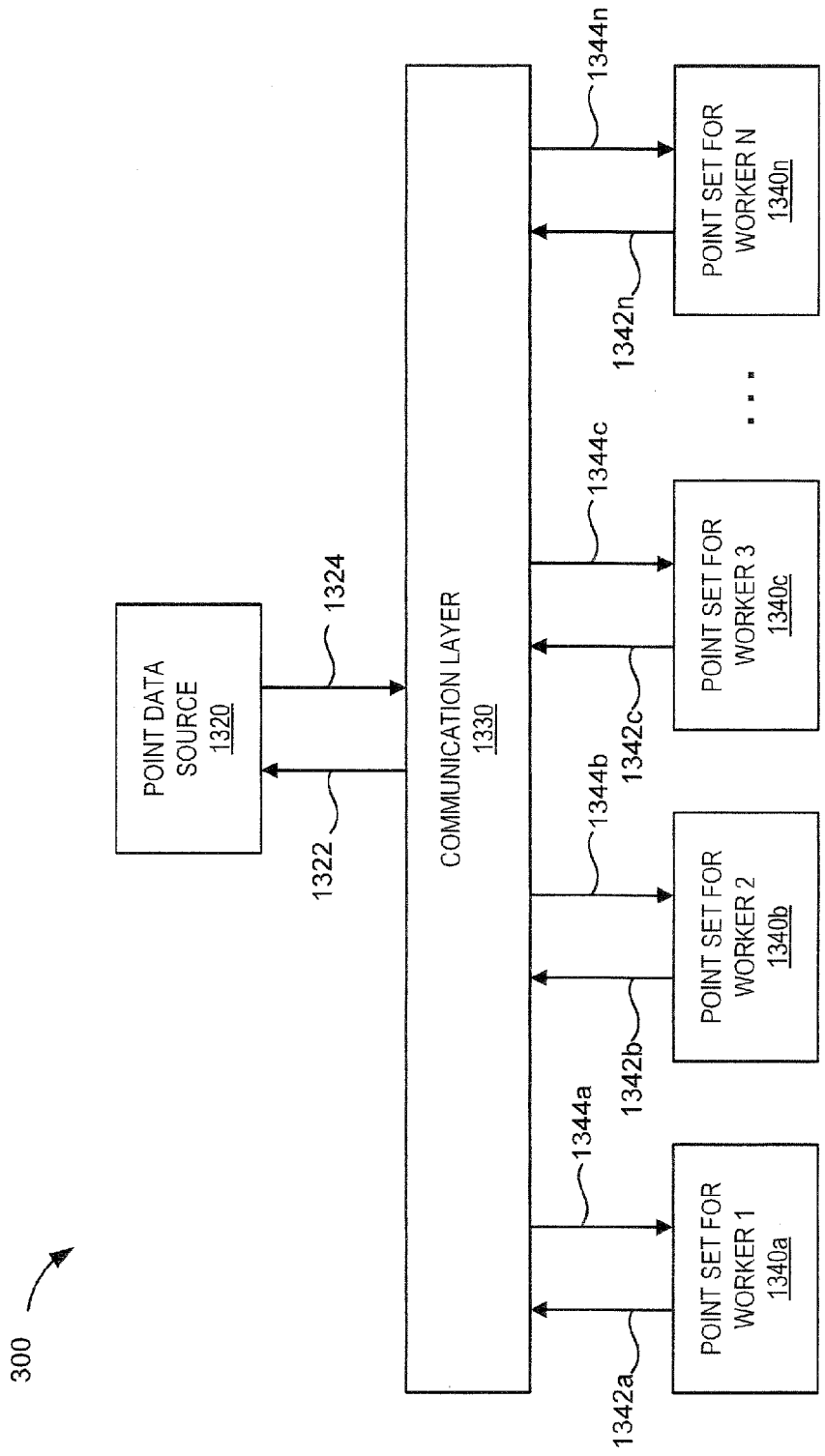
FIG. 13 illustrates a block diagram of an example of a point framework that includes a communication layer between a point data source and one or more workers that may utilize the communication layer to acquire one or more points from the point source.

FIG. 13 illustrates a block diagram of another example embodiment of point framework 700. Referring to FIG. 13, point framework 700 may include a point data source 1320, communication layer 1330, and one or more point sets 1340.

The point data source 1320 may be a source for point data. The point data may be stored in, for example, a database, a file, or some other storage. Moreover, the point data may be, for example, generated on-the-fly using a point generator function. The point data source 1320 may be local, in that it may reside in a computing device that runs TCE 200, and/or may be remote in that the point data source 1320 may reside in one or more remote computing devices. The computing devices may be connected to a communications network, such as the Internet. Moreover, the computing devices may be part of a network cloud. One or more requests for point data may originate at a computing device and sent to one or more other computing devices which may respond to the requests with some or all of the point data.

The communication layer 1330 may contain provisions for gaining access to one or more points contained in the point data source 1320. For example, the communication layer 1330 may implement an application programming interface (API) that may be used to acquire one or more points from the point data source 1320. Here, the points may be acquired by calling one or more functions provided by the API. In addition to or alternatively, the communication layer 1330 may incorporate a messaging scheme that may be used to acquire one or more points from the point data source 1320. Moreover, the communication layer 1330 may utilize one or more communication protocols (e.g., the Transmission Control Protocol/Internet Protocol (TCP/IP), User Datagram Protocol (UDP)) to transfer requests and/or point data between the point data source 1320 and one or more point sets 1340.

A point set 1340 may include a set of one or more points that may be used by a worker (e.g., a sub-solver, a computing device). The point set 1340 may also include logic that may be used to acquire one or more of the points for the points set 1340 from the point data source 1320 via the communication layer 1330.

Operationally, a point set 1340 may issue a request 1342 to the communication layer 1330 for one or more points from the point data source. The request 1342 may include a function call (e.g., a remote procedure call, a local procedure call), message, or other request. The communication layer 1330 may make a request 1322 to the point data source 1320 to acquire the one or more points. The request 1322 may include a function call, message, or other request. The point data source 1320 may respond 1324 to the request 1322 with one or more data points. The communication layer 1330 may respond 1344 to the point set's request 1342 with one or more of the points returned to the communication layer 1330 by response 1324.

One or more points in a point set may be distributed among one or more workers (e.g., sub-solvers, meta-solvers). Here, a particular worker may be assigned a particular subset of points in the point set. The worker may use the assigned subset of points as start points that may be used in one or more attempts to find one or more solutions to a problem.

Figure 14:
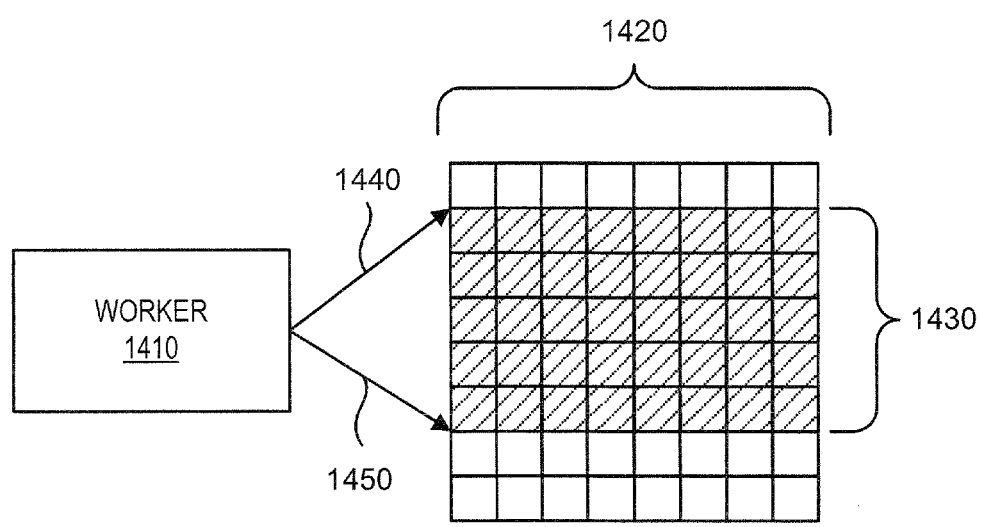
FIG. 14 illustrates a block diagram of an example of a worker accessing one or more points in a point set.

FIG. 14 illustrates a block diagram of an example embodiment of a worker 1410 accessing a subset of points 1430 in a point set 1420. Referring to FIG. 14, the worker 1410 may be provided with a start index 1440 and an end index 1450, which may indicate a start and end, respectively, of the subset of points 1430. The start index 1440 and/or end index 1450 may be provided to the worker 1410 via, for example, an API. The worker 1410 may access one or more points within the subset and utilize these points to, for example, attempt to identify one or more solution to the problem.

Figure 15A:
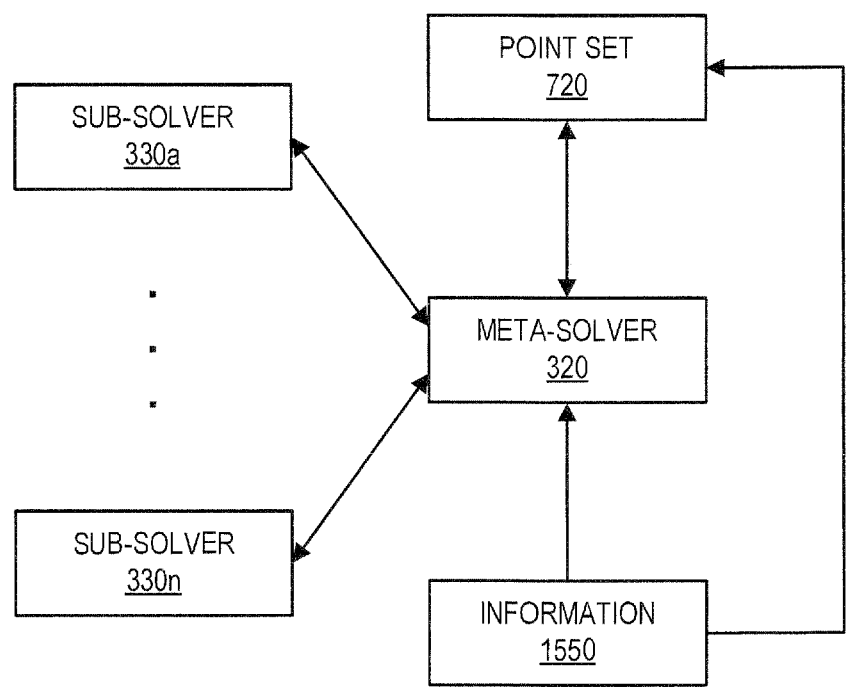
FIGS. 15A-C illustrate block diagrams of example arrangements of a framework that may be used to attempt to find one or more solutions to a problem.
Figure 15B:
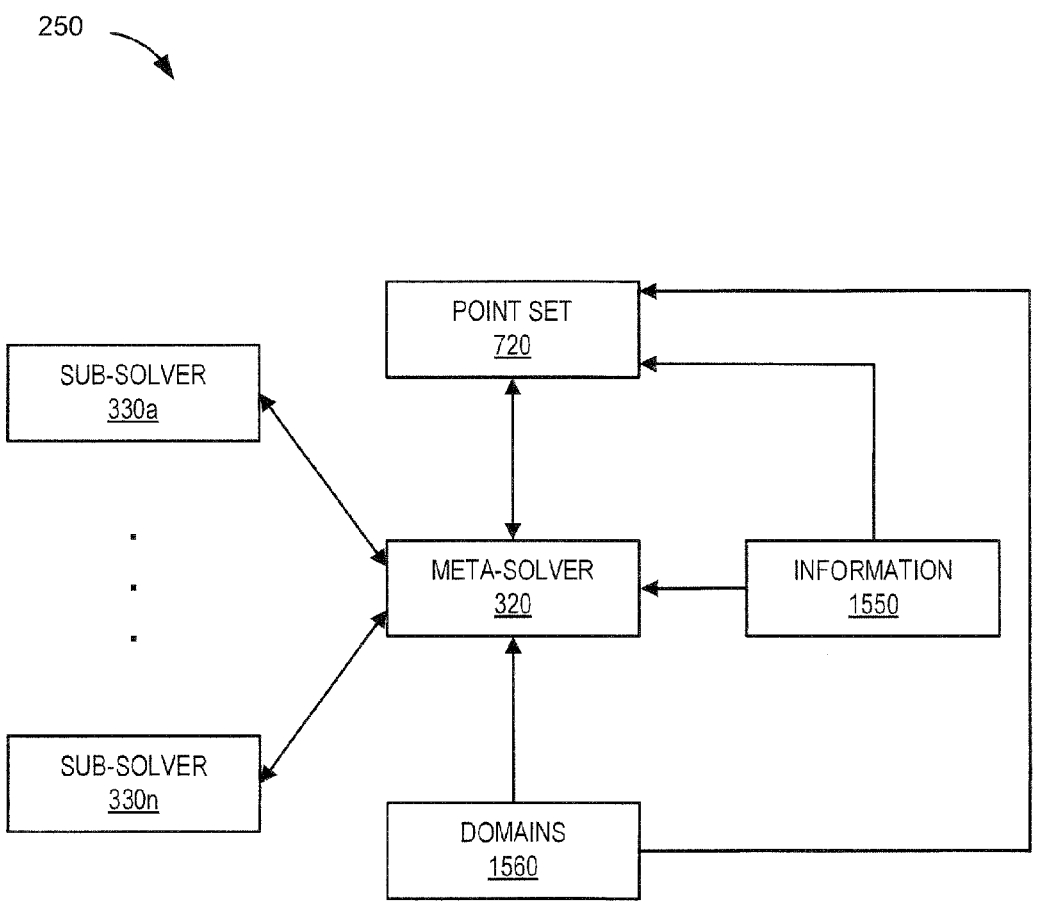
Figure 15C:
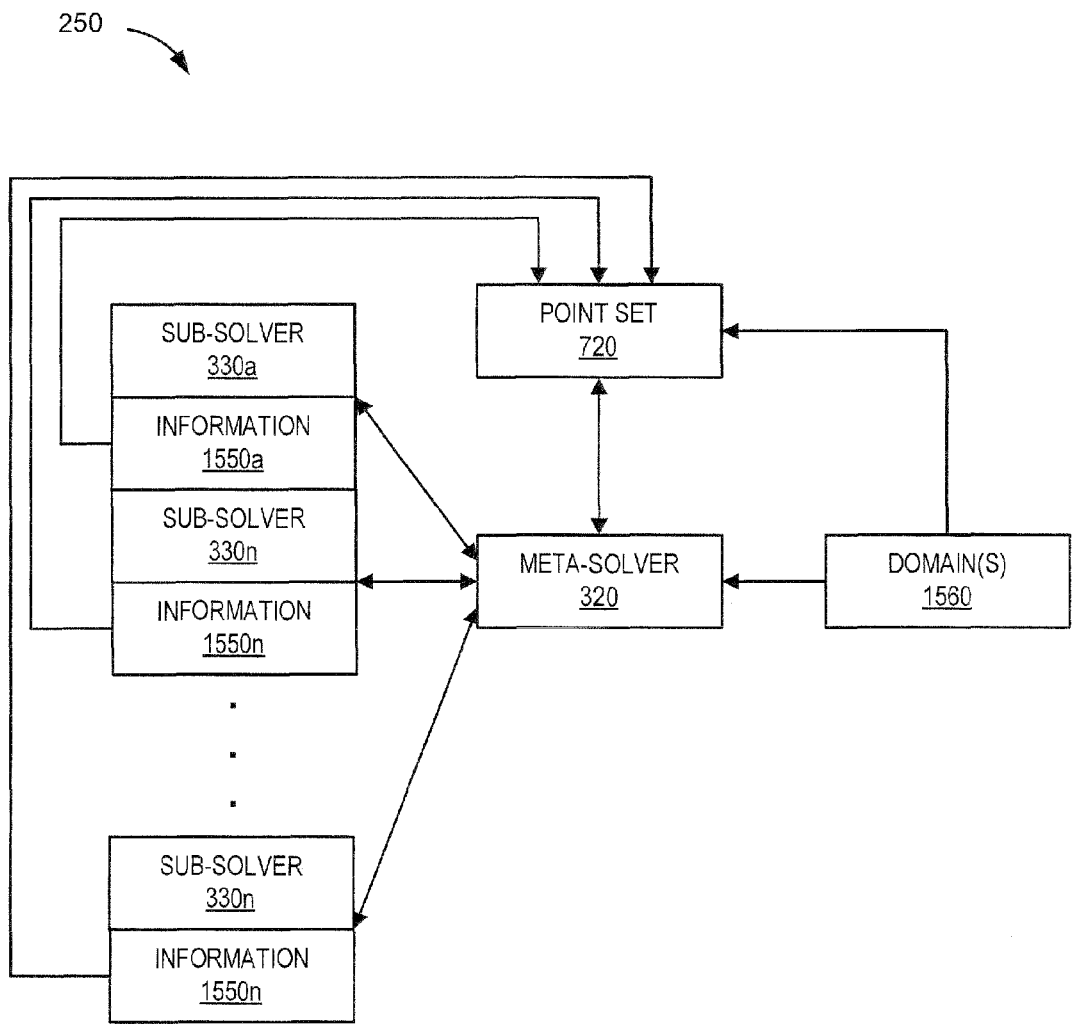

Framework 250 may be arranged a number of different ways to solve various problems. FIGS. 15A-C illustrate block diagrams of example arrangements of framework 250 that may be used to solve various problems.

FIG. 15A illustrates an example arrangement of framework 250 that may be used to solve, for example, problems that may include simulation models. Referring to FIG. 15A, a sub-solver 330 may be an optimization solver. A different sub-solver 330 may be an ordinary differential equation (ODE) solver. The meta-solver 320 may acquire various points for the sub-solvers 330 from the point set 720 based on information 1550. Information 1550 may include a problem description of a problem for which one or more solutions may be found by the meta-solver 320. The point set 720 may use information 1550 to identify points for the meta-solver 320. The meta-solver may transfer the points to the sub-solvers 330. The sub-solvers 330 may attempt to find one or more solutions to the problem based on the points. The sub-solvers 330 may generate one or more results based on the attempt to solve the problem. The meta-solver 320 may acquire the results from the sub-solvers 330 and process the results accordingly. Processing may include adjusting the sub-solvers and/or point set in successive attempts to find one or more solutions to the problem.

FIG. 15B illustrates an example arrangement of framework 250 that may be used to solve one or more problems that may involve different sets of solvers that may utilize points in different domains. Referring to FIG. 15B, in addition to one or more points that may be acquired from the point set 720, the meta-solver 320 may acquire information about one or more domains 1560. The domains 1560 may or may not include the acquired points. A problem for which an attempt to find one or more solutions may be made by the framework 250 may be identified by a problem description contained in information 1550. The problem description along with information about the domains 1560 may be used by the point set 720 to identify one or more points for the meta-solver 420. These points may be transferred by the meta-solver 320 to the sub-solvers 330 to attempt to find an optimal solution to the problem. Note that the domains 1560 may partition a particular search space where a partition may be assigned to a particular sub-solver 330. The sub-solver 330 may utilize one or more points from that partition as, for example, starting points. Also note that a particular sub-solver 330 may be assigned to multiple domains, which may or may not overlap. In addition, note that one or more points (e.g., starting points) utilized by the sub-solver 330 may be from the multiple domains.

FIG. 15C illustrates an example arrangement of framework 250 where multiple problems may be solved by multiple sub-solvers 330. In this arrangement, a sub-solver 330 may be paired with a particular problem contained in information 1550. For example, sub-solver 330a may be paired with one or more problems that may be described in information 1550a. Likewise, sub-solver 330b may be paired with one or more problems that may be described in information 1550b and so on. Information 1550 associated with a sub-solver 330 may be used by the point set 720 to identify one or more points for the sub-solver 330. Likewise, domain information may be used in conjunction with information 1550 to identify the one or more points. Note that in other arrangements, domains may be paired with the sub-solvers 330 along with the information 1550.

Figure 16:
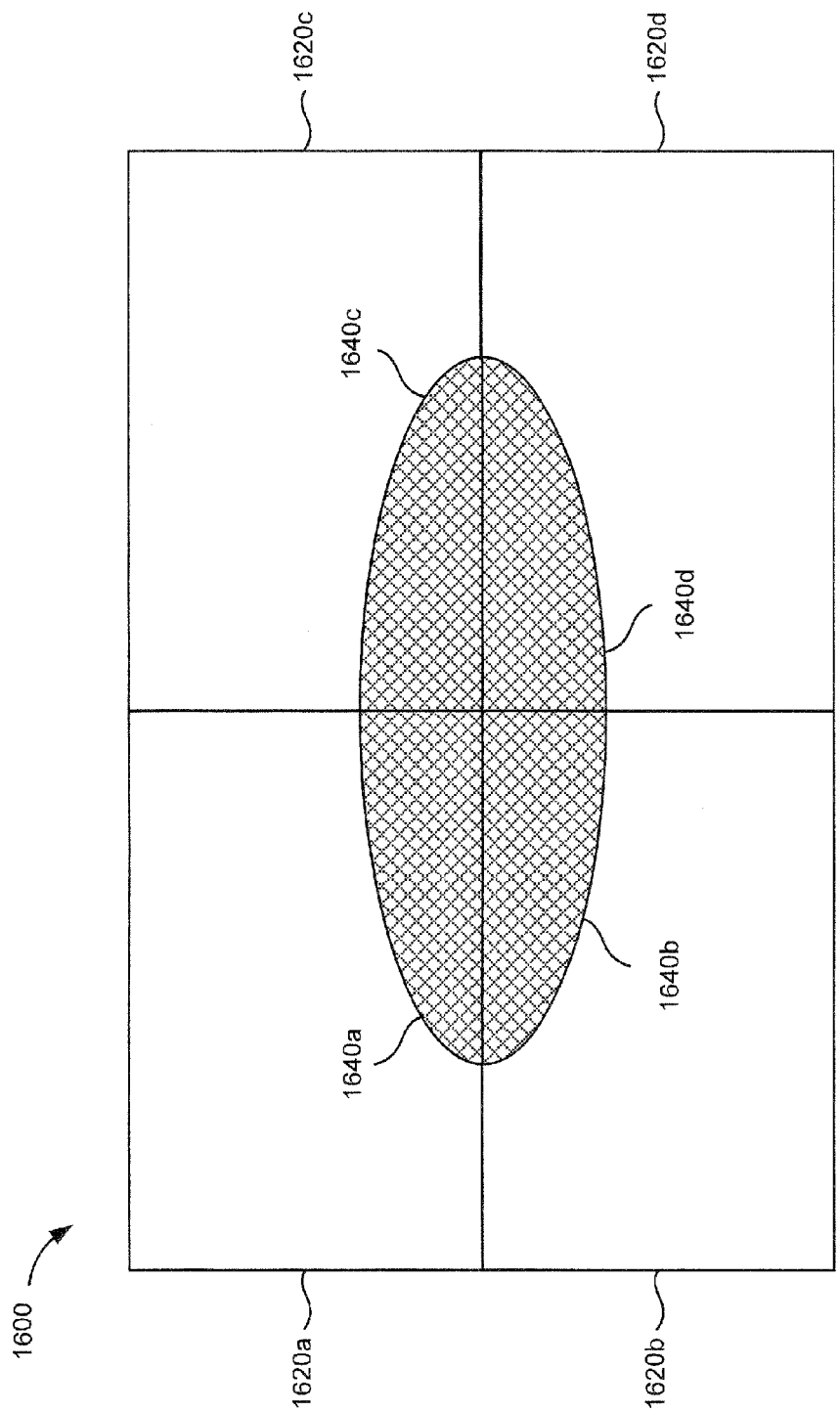
FIG. 16 illustrates an example of a domain space that includes a solution space.

FIG. 16 illustrates an example embodiment of a domain space 1600 that includes a solution space 1640. Referring to FIG. 16, the domain space 1600 may be partitioned into a number of partitions 1620a-d. The domain space 1600 may be defined, for example, by various parameters, such as a lower bounds and an upper bounds. The lower and upper bounds may be specified in a problem description. Some of the points in the domain space 1600 may be infeasible with regards to being a solution to a problem and thus may not be in the solution space 1640.

The domain space 1600 illustrated in FIG. 16 is partitioned into four partitions 1620a-d. A partition 1620 may be processed by one or more sub-solvers. The sub-solvers may operate in parallel on a particular partition 1620 in an attempt to find one or more solutions to a problem that may lie within the partition 1620.

The solution space 1640 may be a region in the domain space 1600 where one or more solutions to the problem may lie. The solution space 1640 may be said to include a set of feasible points, where a feasible point may be a point that may satisfy the problem's constraints. The solution space 1640 illustrated in FIG. 16 contains four partitions 1640a-d. One or more points in a partition 1640 may be found by one or more sub-solvers that may operate, for example, in parallel.

A solver may output progress information that provides an indication of progress towards finding one or more solutions to a problem. For example, one or more sub-solvers 330 may display information about whether the one or more of the sub-solvers 330 have found one or more solutions to a problem and if so, how many solutions they have found. Likewise, for example, one or more sub-solvers 330 may display other information, such as how many attempts the sub-solvers 330 had made towards finding a solution, how much time may be left for the sub-solvers 330 to find one or more solutions, and so on.

Figure 17:
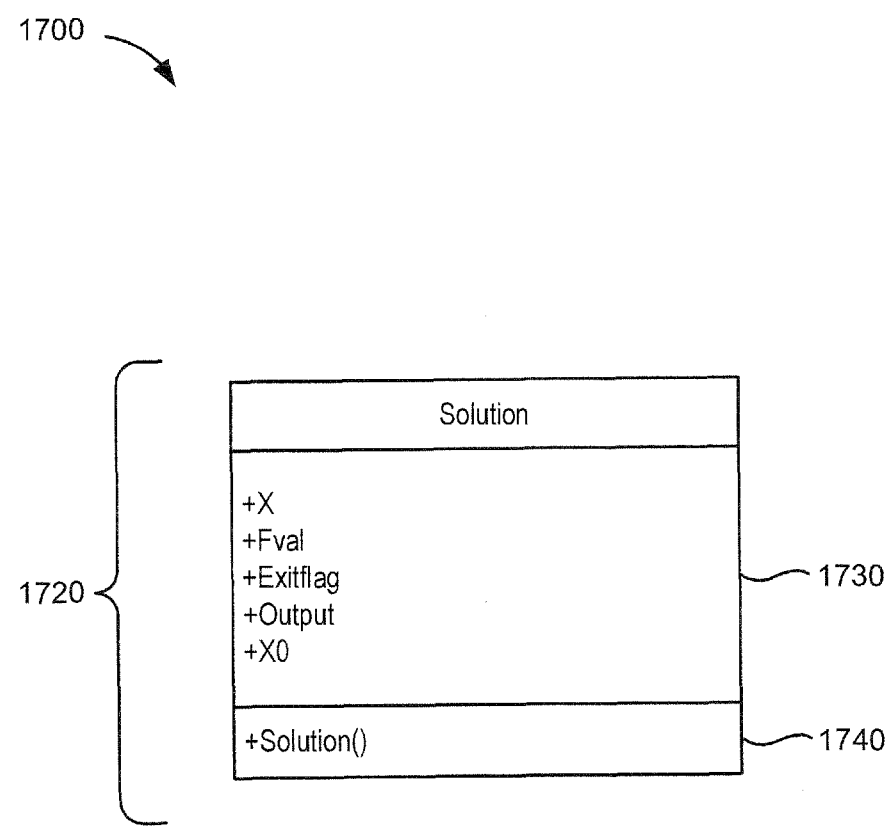
FIG. 17 illustrates a class diagram of an example object that may be used to record a solution to a problem found by a framework.

A solver may also output other information, such as a best solution and/or all solutions that have been found. Here, for example, a meta-solver may query one or more sub-solvers for one or more solutions that the sub-solvers have found and report a best solution and/or all of the solutions returned by the sub-solvers. FIG. 17 illustrates a class diagram 1700 of a Solution class 1720. An object of the Solution class 1720 (Solution object) may be used by a meta-solver to report one or more solutions that may be found by one or more sub-solvers.

Referring to FIG. 17, a Solution object may include one or more data members 1730 and one or more member functions 1740. The data members 1730 may include, for example, free variable values of local minima (X), an objective function value at the local minima (FVAL), a sub-solver exit flag (Exitflag), stores of algorithm state (Output), and one or more points (e.g., start points) that may be used by a sub-solver to find the same solution defined by X and FVAL to a problem (X0) within some specified tolerance. The member functions 1740 may include a constructor member function (Solution), which may initialize one or more data members associated with Solution object. Note that a Solution object may include other data members and other member functions. Also note that a multiplicity of solutions may be realized by a multitude of Solution objects. The multitude of Solution objects may be organized into a collection of Solution objects. For example, the multitude of Solution objects may be organized as an array of Solution objects, a database of Solution objects, or some other structure capable of handling a collection of Solution objects.

The meta-solver may call one or more of the sub-solvers one or more times to find one or more solutions to the problem. The meta-solver may organize the one or more solutions into a collection of Solution objects, as described above. The Exitflag data member in a Solution object may include an exit condition that may be returned by a particular sub-solver. The exit condition that may indicate whether the sub-solver has indeed found a solution to the problem. The Output data member in a Solution object may include one or more algorithmic performance indicators that may be provided by a sub-solver. These algorithmic performance indicators may include, for example, a number of iterations that the sub-solver took before exiting, a number of function evaluations an algorithm (e.g., used by the sub-solver) performed, and/or an optimality measure the algorithm achieved. Note that a Solution object is an example of an object that may be output by a solver, such as a meta-solver.

Figure 18A:
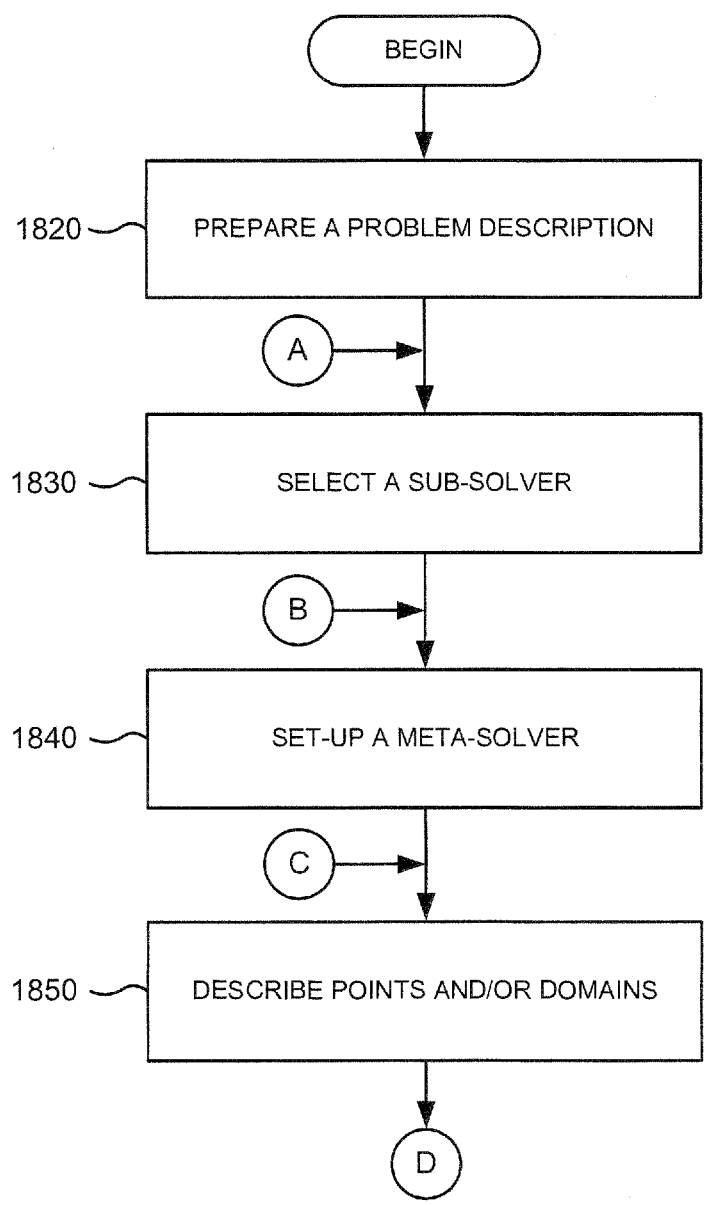
FIGS. 18A-B illustrate a flow chart of example acts that may be used in a workflow that may involve attempting to find one or more solutions to a problem.
Figure 18B:
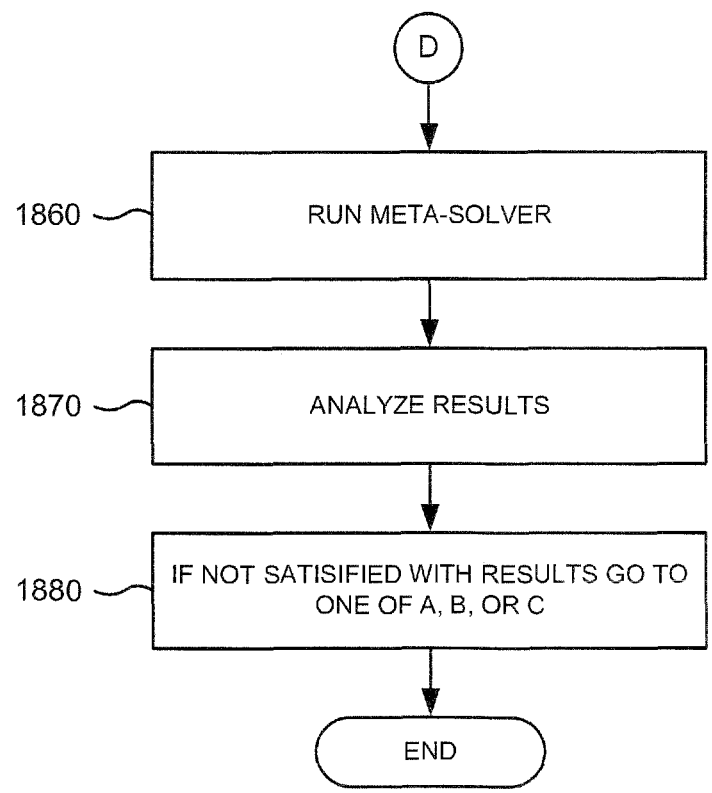

FIGS. 18A-B illustrate a flow chart of example acts that may be used in a workflow that may involve attempting to find one or more solutions to a problem. The workflow may be implemented by a TCE, such as TCE 200. Referring to FIG. 18A, at block 1820, a problem description may be prepared, for example, by a user. The problem description may include, for example, an identifier, objective function, a default start point, linear inequality constraint, linear inequality constraint bounds, linear equality constraint, linear equality constraint bounds, lower bounds, upper bounds, constraint function, solver options, and/or other information that may be relevant to describing a problem. The problem description may be contained in information specified, for example, by a user. The problem description may be represented as a structure in the information, as described above. The information may be input into a TCE, such as TCE 200, via an interface, such as interface 240.

At block 1830, a sub-solver may be selected. The sub-solver may be selected based on the problem description. For example, the problem description may explicitly identify the sub-solver. The sub-solver may be selected by, for example, a user, a meta-solver, a TCE, or some other entity.

At block 1840, a meta-solver may be set-up. The meta-solver may be set-up, for example, by creating an instance of an object that represents the meta-solver. Setting up the meta-solver may also include, for example, establishing (e.g., specifying, setting, initializing) one or more settings associated with the meta-solver. One or more of the settings may be included in one or more data members that may be associated with the meta-solver.

At block 1850, one or more points and/or domains may be described. The points and/or domain may be described, for example, by a user. One or more points may be described by explicitly specifying the points. Alternatively or in addition to, one or more points may be described using a function that may be used to generate the points or using a point framework, such as point framework 700. Note that other ways of describing one or more of the points may be used. One or more of the domains may be described by various parameters such as, for example, bounds that may define the domain, a function that may define the domain, or other parametric information. Note that other ways of describing one or more of the domains may be used.

At block 1860 (FIG. 18B), the meta-solver may be run. The meta-solver may be run by calling a function (e.g., a run function) associated with the meta-solver. Running the meta-solver may involve calling a function (e.g., a run function) associated with the sub-solver and transferring one or more of the points to the sub-solver. The points may be transferred to the sub-solver as one or more parameters in the call to the sub-solver function, via a message, or via some other mechanism. Moreover, the sub-solver may be implemented as a function and the points may be transferred to the sub-solver on an invocation of the function. The sub-solver may attempt to find one or more solutions to the problem based on points transferred to the sub-solver.

At block 1870, the meta-solver may acquire and analyze one or more results from the sub-solver. The results may include (1) a status that indicates whether the sub-solver has found one or more solutions to the problem and (2) one or more solution that have been found by the sub-solver. Based on the analysis, the meta-solver may return one or more of the solutions. The returned solutions may include an optimal solution that was found by the sub-solver. One or more of the returned solutions may be presented, for example, to a user via an interface, such as interface 240.

At block 1880, a determination may be made as to whether the results are satisfactory. The meta-solver may determine whether the results are satisfactory. If the results are determined to not be satisfactory, the workflow may return to block 1830, 1840, or 1850 and acts from that block through block 1880 may be repeated in another attempt to find one or more solutions to the problem. If the results are determined to be satisfactory, additional attempts to find one or more solutions to the problem may not be performed.

Figure 19A:
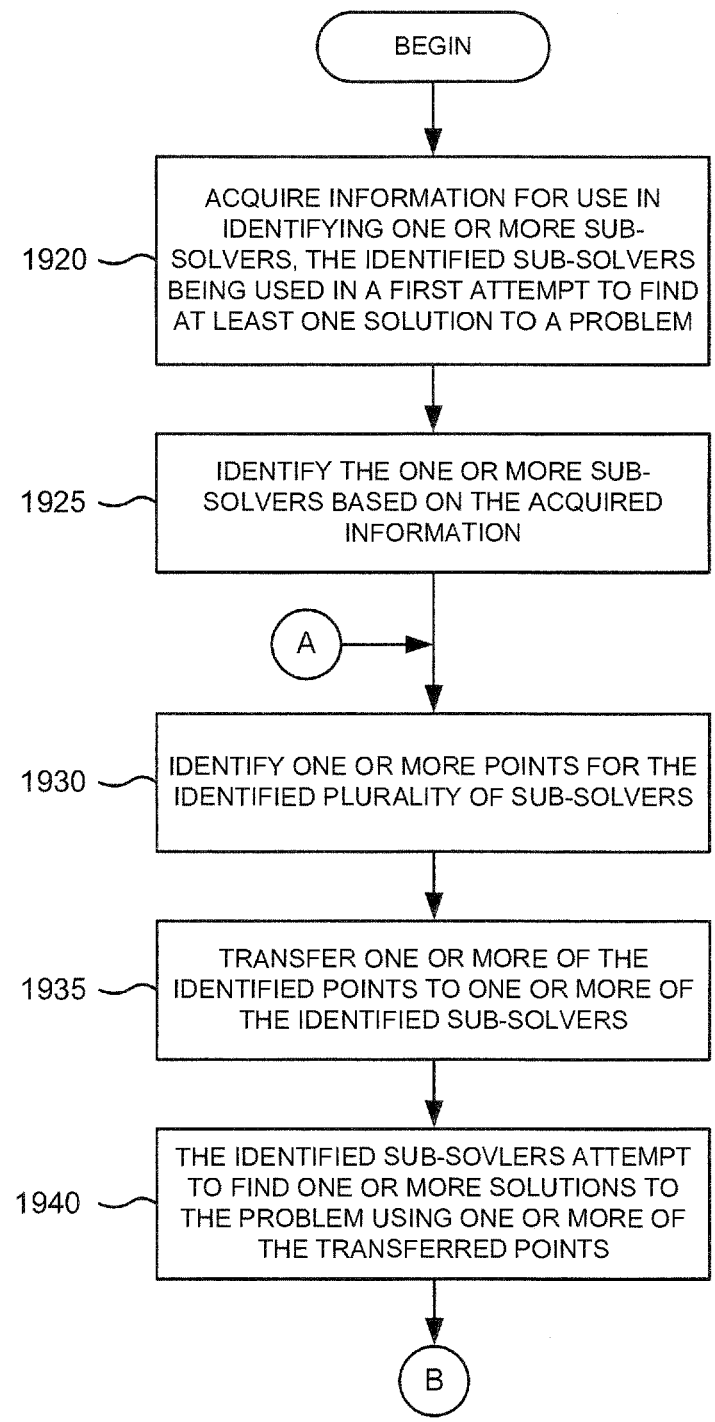
FIGS. 19A-B illustrate a flow chart of example acts that may be used to attempt to find one or more solutions to a problem with a framework that employs a meta-solver/sub-solver arrangement.
Figure 19B:
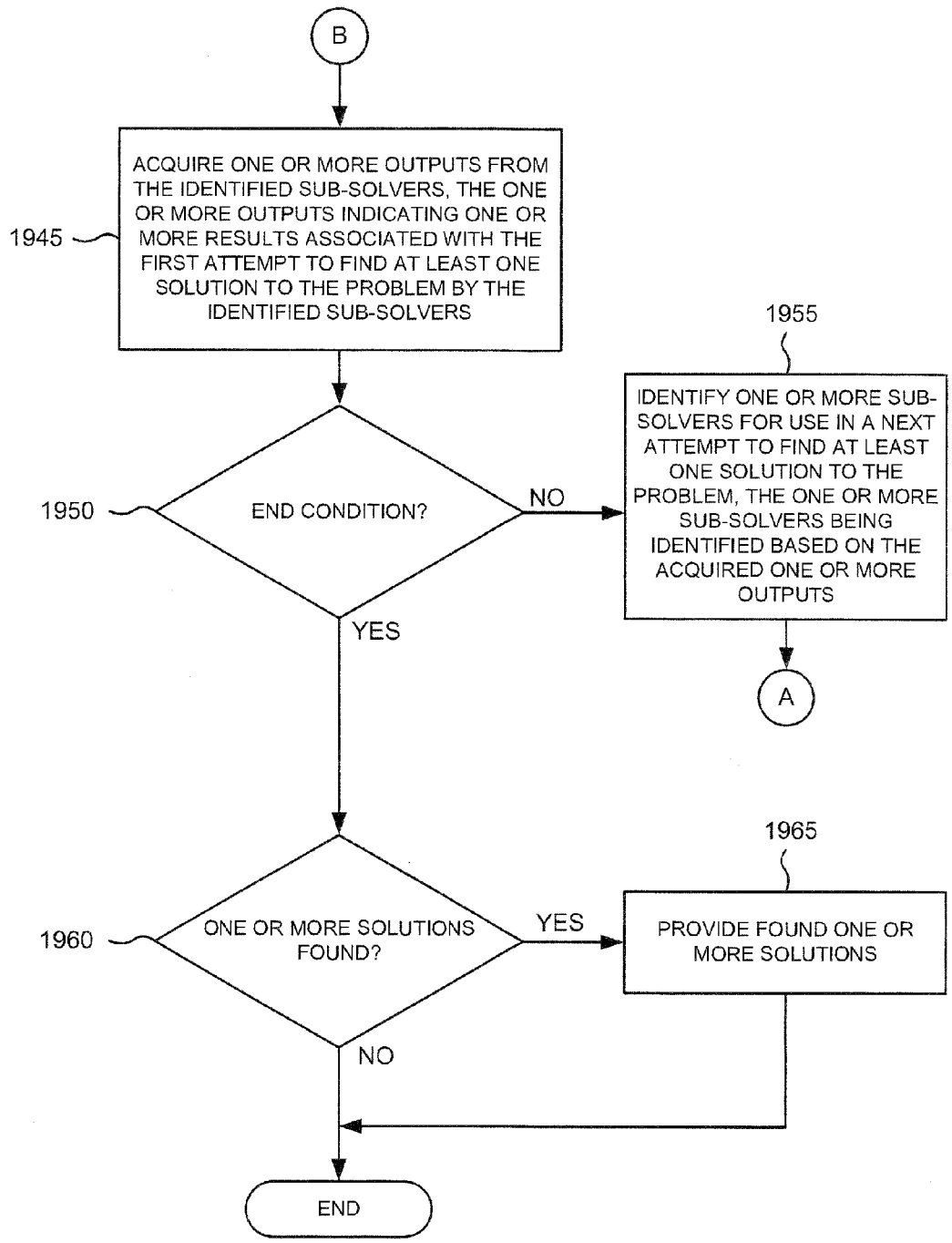

FIGS. 19A-B illustrate a flow chart of example acts that may be used to attempt to find one or more solutions to a problem with a framework that employs a meta-solver/sub-solver arrangement. Referring to FIG. 19A, at block 1920, information for use in identifying one or more sub-solvers may be acquired (e.g., read). The information may include one or more identifiers (e.g., names) that may be used to identify the one or more sub-solvers. The identified sub-solvers may be used in a first attempt to find at least one solution to a problem. Moreover, the information may include, for example, a constraint associated with the problem, a limit of a solution space for the problem, a set of one or more equations that may be used by one or more sub-solvers, a specification of a sub-solver/problem pair, and/or a constraint function that may be used to identify a constraint for one or more sub-solvers. The information may be acquired, for example, by reading the information from a file or database, acquiring the information from a user interface, such as interface 240, acquiring the information via a communications network (e.g., the Internet), or from some other source.

At block 1925, the one or more sub-solvers may be identified based on the acquired information. For example, the information may include a problem description that includes one or more identifiers that may be used to identify one or more of the sub-solvers. Here, identification may involve, for example, determining if the one or more identifiers in the information match one or more identifiers associated with one or more of the sub-solvers.

Likewise, for example, one or more of the sub-solvers may be identified based on other acquired information. For example, the problem description may include other information about the problem (e.g., a formula). One or more of the sub-solvers may be identified based on this other information. Moreover, one or more of the sub-solvers may be identified via a search and/or service request. For example, a service request may be made to one or more sites (e.g., Internet web-sites) that may provide sub-solver services. These services may include use of a sub-solver, use of resources to execute a sub-solver, or other services. A site may provide a list of one or more sub-solver services provided by that site. The site may also provide various criteria associated with the sub-solver services, such as cost of using a particular sub-solver service in the list. The sub-solver may be identified, for example, based on the criteria.

Note that two or more of the identified sub-solvers may be of different types. For example, one of the identified sub-solvers may be a symbolic sub-solver and another identified sub-solver may be a numeric sub-solver.

At block 1930, one or more points, for the identified sub-solvers, may be identified. The one or more points may be starting points for the identified sub-solvers. The one or more points may be identified based on the acquired information. For example, the acquired information may include one or more of the following that may be used to identify one or more of the points: one or more of the points, a function that may be used to generate one or more of the points, a description of one or more of the points and/or domains the points may lie in, or other information.

One or more of the points may be identified from a domain space that may be associated with the problem. For example, a problem description may contain information that may define a domain space for the problem. One or more of the points may be selected by this domain space.

One or more of the identified points may be acquired. For example, one or more of the points may be acquired from an interface, such as interface 240, a database, a simulation of a model, a file, a communications network, and/or a generator function.

One or more of the identified points may be generated based on one or more settings (e.g., sub-solver settings, meta-solver settings, other settings) and/or one or more domain definitions of a domain space for the problem. The one or more settings may include a number of points to generate, a lower bound for the points, and/or an upper bound for the points.

A cache, such as point cache 930, may be used to identify one or more of the points. For example, one or more of the points may be read from the cache. One or more of the points may have already been used by a sub-solver in a previous attempt to find one or more solutions to the problem. Likewise, for example, a point may be identified based on a predefined distance from a point that exists in the cache. The point that exists in the cache may have been used as a starting point by a sub-solver in a previous attempt to find one or more solutions to the problem. Moreover, the cache may be used to place a limit on a total number of points that may be identified.

At block 1935, one or more of the identified points may be transferred to one or more of the identified sub-solvers. The points may be transferred, for example, (1) as one or more arguments in one or more calls to one or more of the identified sub-solvers, (2) via a message sent to one or more of the identified sub-solvers, or (3) via some other mechanism for transferring the points to one or more of the identified sub-solvers.

At block 1940 the identified sub-solvers may make a first attempt to find one or more solutions to the problems using one or more of the transferred points.

At block 1945 (FIG. 19B) one or more outputs from one or more of the identified sub-solvers may be acquired. The one or more outputs may indicate one or more results associated with the first attempt to find at least one solution to the problem by one or more of the identified sub-solvers. The one or more outputs may be acquired, for example, by calling a function, from data returned by one or more calls to one or more of the identified sub-solvers, via messaging, etc. The results may include, for example, one or more solutions to the problem that were found by one or more of the identified sub-solvers.

At block 1950, a check may be performed to determine if an end condition has occurred. An end condition may be a condition that, after it occurs, may lead to ending further attempts to find one or more solutions to the problem. An end condition may include, though is not limited to, one or more of (1) a certain time has elapsed, (2) a certain number of attempts have been made, (3) a certain number of solutions have been found, (4) an optimal solution has been found, or (5) a number of starting points have been tried.

If an end condition has not occurred, at block 1955, one or more sub-solvers for use in a next attempt to find at least one solution to the problem may be identified based on, for example, one or more of the acquired outputs. For example, based on one or more of the acquired outputs a meta-solver may determine that a sub-solver used in the first attempt (current sub-solver) should not be used in the next attempt to find one or more solutions to the problem. Here, the meta-solver may identify a different sub-solver and include the newly identified sub-solver in the identified one or more sub-solvers for the next attempt instead of the current sub-solver.

Likewise, for example, based on one or more of the acquired outputs a meta-solver may determine that the current sub-solver should be used in the next attempt to find one or more solutions to the problem. Here, the meta-solver may include the current sub-solver in the identified one or more solvers for use in the next attempt. Note that the current sub-solver may be adjusted. The current sub-solver may be adjusted based on one or more of the acquired outputs.

One or more of the sub-solvers for use in a next attempt to find at least one solution to the problem may be identified based on information acquired at block 1920. For example, the information may include one or more identifiers that may identify one or more of the sub-solvers for use in the next attempt.

Note that after a sub-solver is identified, either for the first attempt or the next attempt, one or more settings for the identified sub-solvers may be established. For example, a setting that may be established is an identifier (e.g., name, handle) of a function that the sub-solver may call while the sub-solver is executing.

Acts at blocks 1930, 1935, 1940, 1945 and 1950 may be repeated for the sub-solvers that were identified at block 1955.

If at block 1950, an end condition has occurred, at block 1960 a check may be performed to determine whether one or more solutions have been found by one or more of the sub-solvers. If one or more solutions have been found by one or more of the sub-solvers, at block 1965, one or more of the found solutions may be provided. The solutions may be provided by, for example, displaying the solutions on an output device (e.g., output device 170), returning the solutions to a caller, or provided in some other manner.

Referring to FIGS. 1, 12, and 19A-B, suppose, for example, that a user at computing device 100 wants to find one or more solutions to a problem using TCE 200 (FIG. 2). The user may input information into TCE 200 via interface 240 using an input device 160. The information may include, for example, (1) a problem description that describes the problem, and (2) identity information (e.g., names) that may be used to identify one or more sub-solvers 330 for use in attempting to find one or more solutions to the problem. TCE 200 may acquire the information (block 1920) via interface 240 and use the identity information to identify one or more sub-solvers 330 (block 1925).

TCE 200 may determine that one or more of the identified sub-solvers 330 are missing from the TCE 200 (e.g., the sub-solvers 330 are not contained in the solver framework 300). In this situation, the TCE 200 may attempt to locate the missing sub-solvers 330. Here, the TCE 200 may query various nodes (e.g., computing devices) that are attached to a communications network, such as the Internet, to locate and/or acquire the missing sub-solvers 330. As part of the query, the TCE 200 may provide the problem description to the other nodes and the other nodes may identify, locate, and/or provide one or more of the missing sub-solvers 330 based on the provided problem description.

After one or more sub-solvers are identified, TCE 200 may create one or more instances of the one or more sub-solvers 330 (FIG. 3) in framework 300. TCE 200 may also create an instance of a meta-solver 320 in framework 300. The instance of meta-solver 320 may be used to call one or more instances of the sub-solvers 330 to attempt to find one or more solutions to the problem. Alternatively, TCE 200 may create an instance of the meta-solver 320 and pass (transfer) the problem description to meta-solver instance. The meta-solver instance may identify one or more of the sub-solvers 330, based on the problem description, and create instances of the identified sub-solvers 330. Note that the instance of the meta-solver 320 and/or instances of one or more sub-solvers 330 may be created on one or more computing devices that are remote from computing device 100. Further, one or more of the created instances may execute on one or more remote computing devices.

The TCE 200 may identify one or more points (e.g., starting points) for the identified plurality of sub-solvers 330 (block 1930). The one or more points may be identified by the point framework 700, as described above. After the points are identified, the TCE 200 may transfer one or more of the starting points to one or more of the identified sub-solvers 330 (block 1935). One or more points may be transferred to a particular sub-solver 330, for example, via a call to a member function associated with an instance of a meta-solver 320. Alternatively, various messaging techniques may be used to transfer one or more of the points to one or more of the sub-solvers 330.

The meta-solver 320 may direct one or more of the sub-solvers 330 to attempt to find one or more solutions to the problem given the transferred points by calling, for example, run member functions associated with the sub-solvers 330. The sub-solvers 330 may attempt to find one or more solutions (block 1940). The meta-solver 320 may acquire one or more results that may be returned by one or more of the sub-solvers 330 (block 1945). A result from a particular sub-solver 330 may be, for example, an object that may be returned to the meta-solver 320 in response to a call to the sub-solver 330 by the meta-solver 320. The object may contain an exit flag data member that may indicate whether the sub-solver 330 has found one or more solutions to the problem. If the sub-solver 330 has found at least one solution to the problem, the solution may be provided in the result returned by the sub-solver 330.

The meta-solver 320 may determine if an end condition has occurred (block 1950). An end condition may include, for example, whether a certain time has elapsed, a certain number of attempts have been made, a certain number of solutions have been found, an optimal solution has been found, or some other end condition.

If an end condition has not occurred, the meta-solver 320 may identify one or more sub-solvers 330 that may be used in a next attempt to find one or more solutions to the problem (block 1955). The sub-solvers 330 may be identified using one or more of the acquired results. For example, one or more of the results may be used to determine if a different sub-solver 330 should be used in place of a current sub-solver 330 in the next attempt. The above may be repeated in a next attempt to find one or more solutions to the problem.

If an end condition has occurred, the meta-solver 320 may check the results to determine if one or more solutions have been found by one or more of the sub-solvers 330 (1960). If so, the meta-solver 320 may identify a global optimal solution from one or more solutions that have been found and provide the global optimal solution to the TCE 200 (block 1965) via, for example, an object, such as a Solution object.

Figure 20B:
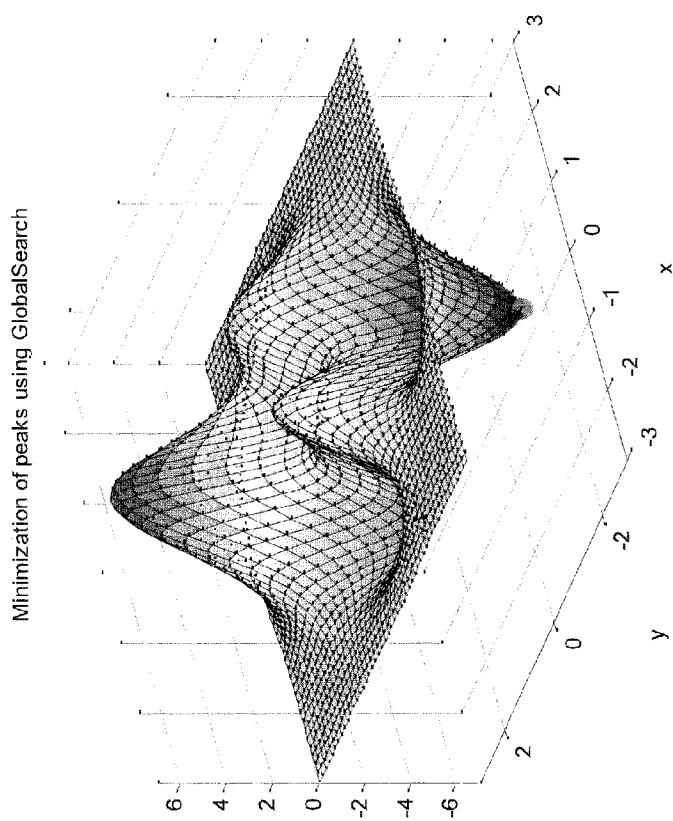

The TCE 200 may present (e.g., display) the global optimal solution using interface 240. The global optimal solution may be presented, for example, textually, graphically, or some other way. Moreover, intermediate solutions may be presented. FIG. 20A illustrates an example textual presentation of one or more intermediate solutions. FIG. 20B illustrates an example graphical presentation of one or more global optimal solutions and/or intermediate solutions. The example presentations in FIGS. 20A-B may be generated by TCE 200 based on information that may be provided by framework 250. The example presentations may be output on an output device 170 via interface 240.

Figure 21:
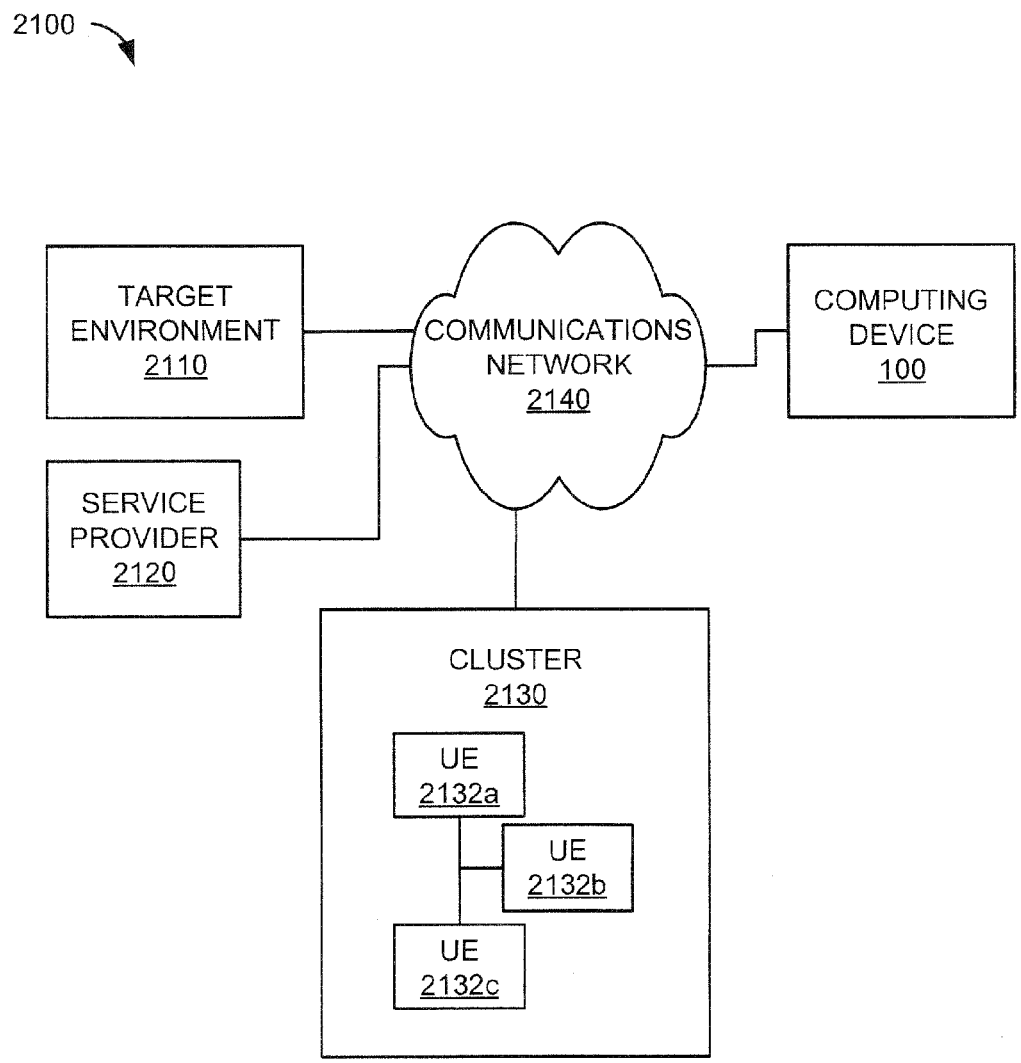
FIG. 21 illustrates a block diagram of an example of a communications network that may implement one or more embodiments of the invention.

One or more embodiments of the invention may be implemented in a distributed environment. FIG. 21 illustrates an example of a distributed environment 2100 that may implement one or more embodiments of the invention. Referring to FIG. 21, environment 2100 may contain various components including computing device 100, target environment 2110, service provider 2120, cluster 2130, and communications network 2140. Note that the distributed environment 2100 is just one example of a distributed environment that may be used with one or more embodiments of the invention. Other distributed environments that may be used with one or more embodiments of the invention may contain more components or fewer components than illustrated in FIG. 21. Moreover, the components in the distributed environments may be arranged differently than the arrangement shown in FIG. 21. In addition, the distributed environments may implement various "cloud computing" frameworks.

Details of computing device 100 were described above with respect to FIG. 1. In distributed environment 2100, computing device 100 may, among other things, exchange information (e.g., data) with other components in the communications network 2140 (e.g., target environment 2110, service provider 2120, and cluster 2130). Computing device 100 may interface with the communications network 2140 via a communication interface 180.

Target environment 2110 may be configured to interpret and/or execute, for example, one or more embodiments of the invention, which may be generated in or otherwise made available to the distributed environment 2100. The communications network 2140 may include digital and/or analog aspects. Information exchanged in communications network 2140 may include machine-readable information having a format that may be adapted for use, for example, in the communications network 2140 and/or with one or more components in the communications network 2140.

For example, the information may be encapsulated in one or more packets that may be used to transfer the information through the communications network 2140. Information may be exchanged between components in the communications network 2140 using various communication protocols, such as, but not limited to, Asynchronous Transfer Mode (ATM), Synchronous Optical Network (SONET), UDP, IP, TCP, TCP/IP, Institute of Electrical and Electronics Engineers (IEEE) 802.11, or some other communication protocol.

The communications network 2140 may comprise various network devices, such as gateways, routers, switches, firewalls, servers, repeaters, address translators, etc. Some or all of the communications network 2140 may be wired (e.g., using wired conductors, optical fibers) and/or wireless (e.g., using free-space optical (FSO), radio frequency (RF), acoustic transmission paths). Some or all of the communications network 2140 may include a substantially open public network, such as the Internet. Some or all of the communications network 2140 may include a more restricted network, such as a private corporate network or virtual private network (VPN). It should be noted that implementations of communications networks and/or devices operating on communications networks described herein are not limited with regards to, for example, information carried by the communications networks, protocols used in the communications networks, and/or the architecture/configuration of the communications networks.

Cluster 2130 may include a number of units of execution (UEs) 2132 that may execute or interpret one or more embodiments of the invention or portions thereof on behalf of computing device 100 and/or another component, such as service provider 2120. The UEs 2132 may reside on a single device or chip or on multiple devices or chips. For example, the UEs 2132 may be implemented in a single ASIC or in multiple ASICs. Likewise, the UEs 2132 may be implemented in a single computer system or multiple computer systems. Other examples of UEs 2132 may include, for example, some combination of FPGAs, CPLDs, ASIPs, processors, multiprocessor systems-on-chip (MPSoCs), graphic processing units, and/or microprocessors. The UEs 2132 may be configured to perform operations on behalf of another component in the distributed environment 2100. For example, in an embodiment, the UEs 2132 are configured to execute portions of code associated with the programming environment 200. Here, the programming environment 200 may dispatch certain activities pertaining to one or more embodiments of the invention to the UEs 2132 for execution. The service provider 2120 may configure cluster 2130 to provide, for example, the above-described services to computing device 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to FIGS. 5, 6A-C, 18A-B, and 19A-B, the order of the acts may be modified in other implementations. Further, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include one or more computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
   analyzing, with a meta solver on a computing device, information for use in solving a problem,
   identifying, with the meta solver on the computing device, one or more first sub solvers for use in solving the problem, the one or more first sub solvers being identified based on analyzing the information,
   performing, with the meta solver on the computing device, a first attempt to solve the problem, comprising requesting the one or more first sub solvers to solve the problem,
   analyzing, with the meta solver on the computing device, one or more first results from the one or more first sub solvers solving the problem in the first attempt,
   based on analyzing the one or more first results,
      adjusting, using the meta solver, the one or more first sub solvers to provide one or more second sub solvers, or
      adjusting, using the meta solver, the one or more first starting points to provide second one or more starting points, at least one of the second starting points being different from the one or more first starting points, and
   performing, with the meta solver on the computing device, a second attempt to solve the problem, using the one or more second sub solvers, or the one or more second starting points.

2. The method of claim 1, wherein adjusting the one or more first sub solvers comprises modifying one or more settings of the one or more first sub solvers without changing a type of the one or more first sub solvers.

3. The method of claim 1, wherein adjusting the one or more first sub solvers comprises adding to the one or more first sub solvers, or replacing one or more of the one or more first sub solvers with, one or more sub solvers that are of different types from the one or more first sub solvers.

4. The method of claim 1, wherein performing the first attempt comprises providing the one or more first sub solvers with one or more first starting points.

5. The method of claim 1, wherein performing the first attempt comprises allowing the one or more first sub solvers to use default starting points without providing the one or more first sub solvers with the one or more first starting points.

6. The method of claim 1, wherein performing the first attempt comprises partitioning a search space in which a solution of the problem is to be searched into one or more partitions and assigning one or more of the partitions to one of the one or more sub solvers.

7. The method of claim 1, wherein the information for use in solving the problem includes a description of the problem.

8. The method of claim 7, wherein the description of the problem includes at least one of a default starting point, a linear inequality constraint, a linear equality constraint, a lower bound, an upper bound, a constraint function, a differential equation or a partial differential equation.

9. The method of claim 1, further comprising establishing settings for the meta solver, wherein the settings include at least one of a specification of information that may be output from the meta solver, a specification of a number of attempts that are permitted to solve the problem, a specification of an amount of time permitted to find solutions to the problem or a specification of tolerances for information used to find solutions to the problem.

10. A non-transitory computer-readable medium storing instructions that, when executed by one or more processors, cause the one or more processors to:
   analyze, with a meta solver, information for use in solving a problem,
   identify, with the meta solver, one or more first sub solvers for use in solving the problem, the one or more first sub solvers being identified based on analyzing the information,
   perform, with the meta solver, a first attempt to solve the problem, comprising requesting the one or more first sub solvers to solve the problem,
   analyze, with the meta solver, one or more first results from the one or more first sub solvers solving the problem in the first attempt,
   based on analyzing the one or more first results,
      adjust, using the meta solver, the one or more first sub solvers to provide one or more second sub solvers, or
      adjust, using the meta solver, the one or more first starting points to provide second one or more starting points, at least one of the second starting points being different from the one or more first starting points, and
   perform, with the meta solver, a second attempt to solve the problem, using the one or more second sub solvers, or the one or more second starting points.

11. The medium of claim 10, wherein adjusting the one or more first sub solvers comprises modifying one or more settings of the one or more first sub solvers without changing a type of the one or more first sub solvers.

12. The medium of claim 10, wherein adjusting the one or more first sub solvers comprises adding to the one or more first sub solvers, or replacing one or more of the one or more first sub solvers with, one or more sub solvers that are of different types from the one or more first sub solvers.

13. The medium of claim 10, wherein performing the first attempt comprises providing the one or more first sub solvers with one or more first starting points.

14. The medium of claim 10, wherein performing the first attempt comprises allowing the one or more first sub solvers to use default starting points without providing the one or more first sub solvers with the one or more first starting points.

15. The medium of claim 10, wherein performing the first attempt comprises partitioning a search space in which a solution of the problem is to be searched into one or more partitions and assigning one or more of the partitions to one of the one or more sub solvers.

16. The medium of claim 10, wherein the information for use in solving the problem includes a description of the problem.

17. The medium of claim 16, wherein the description of the problem includes at least one of a default starting point, a linear inequality constraint, a linear equality constraint, a lower bound, an upper bound, a constraint function, a differential equation or a partial differential equation.

18. The medium of claim 10, further storing instructions for establishing settings for the meta solver, wherein the settings include at least one of a specification of information that may be output from the meta solver, a specification of a number of attempts that are permitted to solve the problem, a specification of an amount of time permitted find solutions to the problem or a specification of tolerances for information used to find solutions to the problem.

19. A computing device, comprising
   one or more processes configured to
   analyze, with a meta solver on the computing device, information for use in solving a problem,
   identify, with the meta solver on the computing device, one or more first sub solvers for use in solving the problem, the one or more first sub solvers being identified based on analyzing the information,
   perform, with the meta solver on the computing device, a first attempt to solve the problem, comprising requesting the one or more first sub solvers to solve the problem,
   analyze, with the meta solver on the computing device, one or more first results from the one or more first sub solvers solving the problem in the first attempt,
   based on analyzing the one or more first results,
      adjust, using the meta solver, the one or more first sub solvers to provide one or more second sub solvers, or
      adjust, using the meta solver, the one or more first starting points to provide second one or more starting points, at least one of the second starting points being different from the one or more first starting points, and
   perform, with the meta solver on the computing device, a second attempt to solve the problem, using the one or more second sub solvers, or the one or more second starting points.

20. The computing device of claim 19 further comprising a storage for storing instructions for configuring the one or more processors.

* * * * *